(12) United States Patent
Ehara et al.

(10) Patent No.: US 12,143,822 B2
(45) Date of Patent: Nov. 12, 2024

(54) CONTROL SYSTEM

(71) Applicant: TOYOTA JIDOSHA KABUSHIKI KAISHA, Toyota (JP)

(72) Inventors: Masato Ehara, Susono (JP); Rentaro Kuroki, Susono (JP); Shunsuke Kobuna, Susono (JP); Tatsuro Kiyohara, Nagoya (JP); Naohiro Seo, Sunto-gun (JP); Takaharu Tateishi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 394 days.

(21) Appl. No.: 17/712,717

(22) Filed: Apr. 4, 2022

(65) Prior Publication Data

US 2022/0394482 A1 Dec. 8, 2022

(30) Foreign Application Priority Data

Jun. 7, 2021 (JP) ................. 2021-095180

(51) Int. Cl.
*H04W 12/125* (2021.01)
*B60L 53/126* (2019.01)
*B60L 53/50* (2019.01)
*B60L 53/66* (2019.01)

(52) U.S. Cl.
CPC ......... *H04W 12/125* (2021.01); *B60L 53/126* (2019.02); *B60L 53/50* (2019.02); *B60L 53/66* (2019.02)

(58) Field of Classification Search
CPC .... B60L 3/0023; B60L 53/126; B60L 53/305; B60L 53/50; B60L 53/62; B60L 53/65; B60L 53/66; H04W 12/125
See application file for complete search history.

(56) References Cited

U.S. PATENT DOCUMENTS

2012/0310428 A1 12/2012 Katagi et al.
2016/0137087 A1 5/2016 Haas et al.
(Continued)

FOREIGN PATENT DOCUMENTS

| JP | 2012-252580 A | 12/2012 |
| JP | 2018-011507 A | 1/2018 |
| JP | 2021-061516 A | 4/2021 |

*Primary Examiner* — Timothy X Pham
(74) *Attorney, Agent, or Firm* — Finnegan, Henderson, Farabow, Garrett, and Dunner, LLP

(57) ABSTRACT

A control system includes a computer configured to remotely control at least one of charging and discharging of a power storage device mounted on a control target. The computer is configured to transmit a first command indicating charging power or discharging power of the power storage device to the control target via each of a first communication path and a second communication path. The control system further includes a determination unit configured to determine whether or not any one of the first communication path and the second communication path is under a cyberattack by using a second command received by the control target via the first communication path when the computer transmits the first command, and a third command received by the control target via the second communication path when the computer transmits the first command.

12 Claims, 14 Drawing Sheets

(56) References Cited

U.S. PATENT DOCUMENTS

| | | | |
|---|---|---|---|
| 2016/0159239 A1* | 6/2016 | Shi | B60L 53/14 |
| | | | 320/134 |
| 2020/0162487 A1* | 5/2020 | Hong | H04L 63/1416 |
| 2020/0282854 A1* | 9/2020 | Liu | B60L 53/67 |

* cited by examiner

CONTROL SYSTEM

CROSS-REFERENCE TO RELATED APPLICATION

This application claims priority to Japanese Patent Application No. 2021-095180 filed on Jun. 7, 2021, incorporated herein by reference in its entirety.

BACKGROUND

1. Technical Field

The present disclosure relates to a control system, and more particularly to the technology of remotely controlling at least one of charging and discharging of a power storage device mounted on a control target.

2. Description of Related Art

For example, Japanese Unexamined Patent Application Publication No. 2018-11507 (JP 2018-11507 A) discloses an electric vehicle supply equipment (EVSE) server that transmits a control signal to EVSE. The EVSE server remotely controls a maximum current of the EVSE by transmitting a predetermined control signal to the EVSE.

SUMMARY

In recent years, as an energy management-related art, the technology of remotely controlling at least one of charging and discharging of a power storage device mounted on a control target has attracted attention. For example, at least one of charging and discharging of the power storage device can be remotely controlled by a server transmitting a charging/discharging command of the power storage device (that is, a signal for giving an instruction of charging or discharging of the power storage device) to the control target. Note that the remote control is vulnerable to cyberattack.

In order to improve the reliability of the remote control, it is needed to accurately determine the presence or absence of the cyberattack and take countermeasures at an early stage when the cyberattack occurs. As a method of determining the presence or absence of the cyberattack, for example, a method of comparing a power value (command value) indicated by a charging/discharging command received by the control target from the server and a charging power value or a discharging power value of the power storage device detected in the control target can be considered. In a case where the power value (charging power value or discharging power value) in response to the command from the server is not detected in the control target, it is considered that the charging or discharging of the power storage device is controlled by a command other than the command from the server, as well as the command from the server (that is, an interference-type cyberattack occurs).

However, the cyberattack that may occur on the remote control is not limited to the interference-type cyberattack. There is a possibility that the remote control is under a falsification-type cyberattack (that is, a cyberattack that falsifies the command value). In a case where the command issued from the server is falsified before reaching the control target and the control target executes the charging or discharging of the power storage device in response to the falsified charging/discharging command, the command value received by the control target and a detection value in the control target coincide with each other. Therefore, it is difficult to detect a falsification-type cyberattack by the method described above.

The present disclosure has been made to solve the problems described above, and is to provide a control system that can accurately determine the presence or absence of a cyberattack and to execute at least one of charging and discharging of a power storage device by a highly reliable remote control.

An aspect of the present disclosure relates to a control system comprising a computer configured to remotely control at least one of charging and discharging of a power storage device mounted on a control target. The computer is configured to transmit a first command indicating charging power or discharging power of the power storage device to the control target via each of a first communication path and a second communication path. The control system further includes a determination unit configured to determine whether or not any one of the first communication path and the second communication path is under a cyberattack by using a second command received by the control target via the first communication path when the computer transmits the first command, and a third command received by the control target via the second communication path when the computer transmits the first command.

In the following, the computer is also referred to as a "control computer". In the following, charging and discharging are collectively referred to as "charging/discharging". Charging/discharging of the power storage device means a movement of electricity inside and outside the power storage device, and includes both charging and discharging of the power storage device. A command for giving an instruction of charging or discharging of the power storage device is also referred to as a "charging/discharging command".

With the control system having the configuration described above, it is possible to accurately determine the presence or absence of the falsification-type cyberattack. Note that since a possibility that two communication paths (first communication path and second communication path) are under the cyberattack at the same time is low, here, a case is assumed where any one of the first communication path and the second communication path is solely under the cyberattack.

Specifically, the control computer transmits the same charging/discharging command (first command) to the control target via each of two different types of communication paths (first communication path and second communication path). The control target receives the second command from the first communication path, and receives the third command from the second communication path. In a case where the first communication path is under the falsification-type cyberattack, the first command and the second command do not coincide with each other. In a case where the second communication path is under the falsification-type cyberattack, the first command and the third command do not coincide with each other. Therefore, in a case where any one of the first communication path and the second communication path is under the falsification-type cyberattack, any one of the second command and the third command do not coincide with the first command. By using the second command and the third command, it is possible for the determination unit to easily and accurately determine whether or not any one of the first communication path and the second communication path is under the cyberattack. Note that the fact that the two values "do not coincide with each other" means that the two values deviate from each other beyond a predetermined allowable range. The allowable range is a range in which the two values can be regarded as substantially the same, and may be predetermined based on an experimental result.

The control computer may be a stationary server, or may be mounted on a mobile terminal.

Examples of the control target include a building (house, factory, and the like), an electrical device, an unmanned moving object (automated guided vehicle (AGV), agricultural machinery, walking robot, drone, robot cleaner, space probe, and the like), and a conveyance (automobile, railroad vehicle, ship, airplane, and the like).

The determination unit may be mounted on the control target. The determination unit may be configured to, in a case where the second command and the third command do not coincide with each other, determine that any one of the first communication path and the second communication path is under the cyberattack.

With the configuration described above, the control target can accurately determine whether or not any one of the first communication path and the second communication path is under the falsification-type cyberattack.

The determination unit may be configured to acquire first power indicating charging power or discharging power of the power storage device when charging or discharging in response to the second command is executed, and second power indicating charging power or discharging power of the power storage device when charging or discharging in response to the third command is executed. The determination unit may be configured to in a case where the second command and the third command coincide with each other, power indicated by the second command and the first power coincide with each other, and power indicated by the third command and the second power coincide with each other, determine that both the first communication path and the second communication path are not under the cyberattack.

With the configuration described above, the control target can easily confirm that both the first communication path nor the second communication path are not under the cyberattack.

Each of the first power and the second power may be a power value detected by a sensor mounted on the control target.

The determination unit may be configured to, in a case where the second command and the third command do not coincide with each other, specify which of the first communication path and the second communication path is under the cyberattack by using the first power and the second power.

With the configuration described above, the control target can accurately specify which of the first communication path and the second communication path is under the falsification-type cyberattack. For example, in a case where any one of the first power and the second power solely behaves differently than usual, the control target may determine that the corresponding communication path is under the cyberattack.

The determination unit may be configured to, in a case where the second command and the third command coincide with each other, the power indicated by the second command and the first power do not coincide with each other, and the power indicated by the third command and the second power coincide with each other, determine that the first communication path is under the cyberattack. The determination unit may be configured to, in a case where the second command and the third command coincide with each other, the power indicated by the second command and the first power coincide with each other, and the power indicated by the third command and the second power do not coincide with each other, determine that the second communication path is under the cyberattack.

With the configuration described above, the control target can accurately determine whether or not each of the first communication path and the second communication path is under the interference-type cyberattack. In a case where the command value and an actual power value are different in solely one of the first communication path and the second communication path even though the second command and the third command coincide with each other, a possibility that the communication path is under the interference-type cyberattack is high.

The determination unit may be configured to, in a case where the second command and the third command coincide with each other, the power indicated by the second command and the first power do not coincide with each other, and the power indicated by the third command and the second power do not coincide with each other, determine that a failure occurs in the control target.

With the configuration described above, the control target can easily confirm that charging/discharging of the power storage device is not appropriately executed due to the failure.

The determination unit may be mounted on the control computer. The control computer may be configured to acquire the second command and the third command from the control target. The determination unit may be configured to, in a case where the first command and the second command do not coincide with each other, determine that the first communication path is under the cyberattack, and in a case where the first command and the third command do not coincide with each other, determine that the second communication path is under the cyberattack.

With the configuration described above, the control computer can accurately determine whether or not each of the first communication path and the second communication path is under the falsification-type cyberattack.

The control computer may be configured to execute a charging control of the power storage device such that a first charging period in which the first command is transmitted from the control computer to the control target via the first communication path and the control target executes charging of the power storage device in response to the second command, and a second charging period in which the first command is transmitted from the control computer to the control target via the second communication path and the control target executes charging of the power storage device in response to the third command are included in one charging of the power storage device. The determination unit may be configured to determine whether or not any one of the first communication path and the second communication path is under the cyberattack by using the second command in the first charging period and the third command in the second charging period.

With the configuration described above, a determination as to whether or not any one of the first communication path and the second communication path is under the cyberattack can be made in one charging.

The control computer may be configured to execute a discharging control of the power storage device such that a first discharging period in which the first command is transmitted from the control computer to the control target via the first communication path and the control target executes discharging of the power storage device in response to the second command, and a second discharging period in which the first command is transmitted from the control computer to the control target via the second communication path and the control target executes discharging of the power storage device in response to the third command are included in one discharging of the power storage device. The determination unit may be configured to determine whether or not any one of the first communication path and the second communication path is under the cyberattack by using the second command in the first discharging period and the third command in the second discharging period.

With the configuration described above, a determination as to whether or not any one of the first communication path and the second communication path is under the cyberattack can be made in one discharging.

The control target may be configured to, in a case where the determination unit determines that the first communication path is under the cyberattack, prohibit charging and discharging of the power storage device in response to a command received by the control target via the first communication path, and in a case where the determination unit determines that the second communication path is under the cyberattack, prohibit charging and discharging of the power storage device in response to a command received by the control target via the second communication path.

With the configuration described above, the execution of charging/discharging of the power storage device using the communication path under the cyberattack can be suppressed.

The control target may be a vehicle. The first communication path may be a communication path through which a signal is transmitted from the control computer to the vehicle via electric vehicle supply equipment. The second communication path may be a communication path through which a signal is transmitted from the control computer to the vehicle by wireless communication without the electric vehicle supply equipment.

With the configuration described above, it is possible to appropriately remotely control at least one of charging and discharging of the power storage device mounted on the vehicle.

The vehicle may include the power storage device configured to be charged by power supplied from electric vehicle supply equipment (EVSE), and may be configured to travel using the power stored in the power storage device. The vehicle may be a battery electric vehicle (BEV), or a plug-in hybrid vehicle (PHEV).

The determination unit may be configured to, in a case where a predetermined number or more of the control targets present in a predetermined region are under the cyberattack on the same communication path, determine that the predetermined region is under the cyberattack. With such a configuration, the presence or absence of the cyberattack on the region can be accurately determined.

The determination unit may be configured to, in a case where a predetermined number or more of the control targets present in a predetermined region are under the same cyberattack, determine that the predetermined region is under the cyberattack. Even with such a configuration, the presence or absence of the cyberattack on the region can be accurately determined. In a case where each control target that is under the cyberattack has the same symptom, the determination unit may recognize that the control targets are under the same cyberattack.

Note that example of the cyberattack on the region is an attack in which the power storage devices present in a predetermined region are caused to execute charging at the same time and the power supply to the region is blacked out (power outage).

The control computer may include a notification unit configured to, in a case where the determination unit determines that the predetermined region is under the cyberattack, execute notification processing with respect to a user of the control target present in the predetermined region.

With the configuration described above, it is possible for the user of each control target present in the region to easily grasp that the predetermined region is under the cyberattack, and easily take countermeasures at an early stage. The notification unit may give a predetermined notification to a user terminal of each control target. The user terminal may be registered in the control computer in advance. The user terminal may be a terminal mounted on the control target, or a mobile terminal carried by the user of the control target.

According to the present disclosure, it is possible to provide the control system that can accurately determine the presence or absence of the cyberattack and execute at least one of charging and discharging of the power storage device by a highly reliable remote control.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In the following, embodiments of the present disclosure will be described in detail with reference to the drawings. In the figures, the same or corresponding parts are designated by the same reference signs and the description thereof will not be repeated.

First Embodiment

Figure 1:
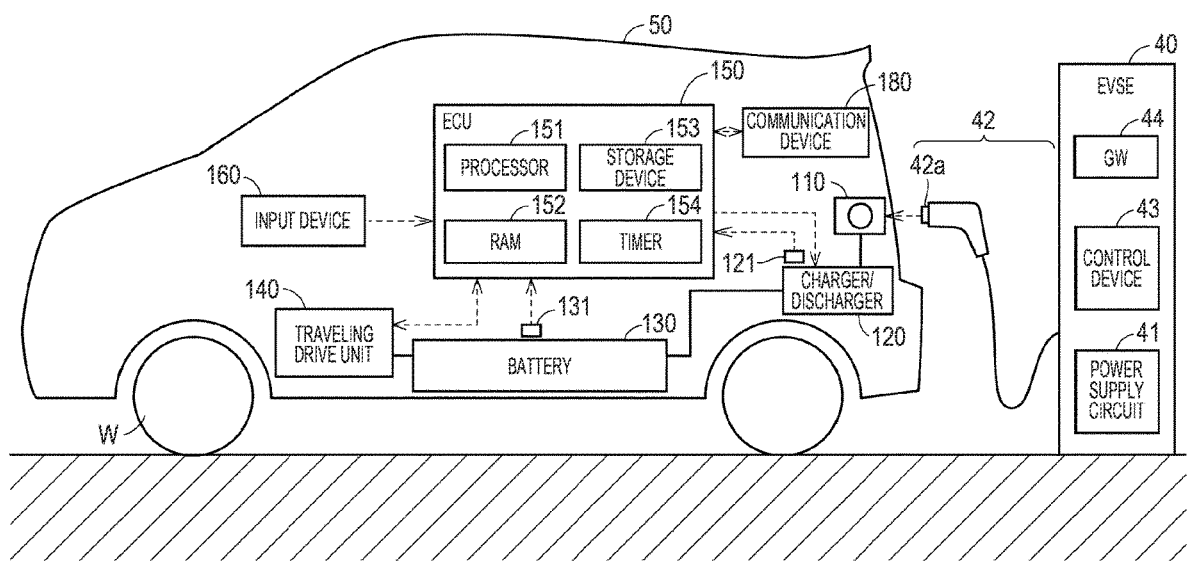
FIG. 1 is a diagram showing a configuration of a vehicle that is a control target in a control system according to a first embodiment of the present disclosure.

FIG. 1 is a diagram showing a configuration of a vehicle 50 that is a control target in a control system according to the present embodiment. The vehicle 50 corresponds to an example of a "control target" according to the present disclosure.

With reference to FIG. 1, the vehicle 50 includes a battery 130 that stores power for traveling. The vehicle 50 is configured to travel by using the power stored in the battery 130. The vehicle 50 according to the present embodiment is a battery electric vehicle (BEV) without an engine (internal combustion engine).

For example, the battery 130 includes a secondary battery, such as a lithium ion battery or a nickel metal hydride battery. The secondary battery may be an all-solid-state battery. In the present embodiment, an assembled battery including a plurality of lithium ion batteries is adopted as the secondary battery. Note that another power storage device, such as an electric double layer capacitor, may be adopted instead of the secondary battery. The battery 130 according to the present embodiment corresponds to an example of a "power storage device" according to the present disclosure.

The vehicle 50 includes an electronic control device (in the following, referred to as an "electronic control unit (ECU)") 150. The ECU 150 is configured to execute a charging control and a discharging control of the battery 130. In addition, the ECU 150 is configured to control the communication with the outside of the vehicle 50.

The vehicle 50 further includes a monitoring module 131 that monitors a state of the battery 130. The monitoring module 131 includes various sensors that detect the state of the battery 130 (for example, a voltage, a current, and a temperature), and outputs the detection result to the ECU 150. The monitoring module 131 may be a battery management system (BMS) further having a state-of-charge (SOC) estimation function, a state-of-health (SOH) estimation function, a cell voltage equalization function, a diagnosis function, and a communication function, in addition to the sensor function. The ECU 150 can acquire the state of the battery 130 (for example, the temperature, the current, the voltage, the SOC, and an internal resistance) based on the output of the monitoring module 131.

An electric vehicle supply equipment (EVSE) 40 corresponds to power supply equipment outside the vehicle. For example, the EVSE 40 is a non-public EVSE that can be used solely by a specific user. In the present embodiment, the EVSE 40 is a household EVSE. Note that the present disclosure is not limited to this, and the EVSE 40 may be a public EVSE that can be used by an unspecified number of users.

The EVSE 40 includes a power supply circuit 41, a charging cable 42, a control device 43, and a gateway (GW) 44. The charging cable 42 is connected to a main body of the EVSE 40. The charging cable 42 may be always connected to the main body of the EVSE 40, or may be detachable from the main body of the EVSE 40. The charging cable 42 has a connector 42a at a distal end thereof, and includes a communication line and a power line inside. One electric wire may serve as both the communication line and the power line.

The control device 43 is configured to execute the charging/discharging control of the power storage device electrically connected to the EVSE 40. A computer including a processor and a storage device can be adopted as the control device 43. The control device 43 is configured to communicate with the control target by wire via the charging cable 42. In addition, the control device 43 is configured to communicate with an external device of the EVSE 40 via the Internet. The control device 43 accesses the Internet through the GW 44. The GW 44 includes a modem for accessing the Internet. For example, the GW 44 accesses the Internet via a wireless local area network (WLAN). Note that the present disclosure is not limited to this, and the GW 44 may access the Internet by the wire communication. The GW 44 may be configured to access the Internet via a cable or an optical fiber.

The vehicle 50 includes an inlet 110 for contact charging and a charger/discharger 120. The inlet 110 is configured to receive the power supplied from the outside of the vehicle 50. The inlet 110 is configured to be connected to the connector 42a of the charging cable 42. By connecting the connector 42a of the charging cable 42 connected to the EVSE 40 to the inlet 110 of the vehicle 50, the vehicle 50 is put into a plug-in state (that is, a state in which the power can be exchanged between the vehicle 50 and the EVSE 40). Note that although FIG. 1 shows solely the inlet 110 and the charger/discharger 120 compatible with a power supply method of the EVSE 40, the vehicle 50 may include a plurality of inlets that can be compatible with a plurality types of power supply methods (for example, an AC method and a DC method).

The charger/discharger 120 is positioned between the inlet 110 and the battery 130. The charger/discharger 120 includes a relay and a power conversion circuit (none of which are shown). The relay switches connection/disconnection of a power path from the inlet 110 to the battery 130. For example, the power conversion circuit includes a bidirectional inverter. Each of the relay and the power conversion circuit provided in the charger/discharger 120 is controlled by the ECU 150. The vehicle 50 further includes a monitoring module 121 that monitors a state of the charger/discharger 120. The monitoring module 121 includes various sensors that detect the state of the charger/discharger 120, and outputs the detection result to the ECU 150. In the present embodiment, the monitoring module 121 is configured to detect a voltage and a current input to the power conversion circuit, and a voltage and a current output from the power conversion circuit. The monitoring module 121 is configured to detect the charging power and the discharging power of the battery 130.

In the vehicle 50 in the plug-in state, external charging (that is, charging the battery 130 with the power supplied from the EVSE 40) and external power supply (that is, power supply to the EVSE 40 from the vehicle 50) can be executed. The power for external charging is supplied to the inlet 110 from, for example, the EVSE 40 through the charging cable 42. The charger/discharger 120 is configured to convert the power received by the inlet 110 into power suitable for charging the battery 130, and output the converted power to the battery 130. The power for external power supply is supplied from the battery 130 to the charger/discharger 120. The charger/discharger 120 is configured to convert the power supplied from the battery 130 into power suitable for external power supply, and output the converted power to the inlet 110. When any one of external charging or external power supply is executed, the relay of the charger/discharger 120 is put into a closed state (connected state), and when both external charging and external power supply are not executed, the relay of the charger/discharger 120 is put into an opened state (disconnected state).

The ECU 150 includes a processor 151, a random access memory (RAM) 152, a storage device 153, and a timer 154. The ECU 150 may be a computer. The processor 151 may be a central processing unit (CPU). The RAM 152 functions as a working memory that transitorily stores the data processed by the processor 151. The storage device 153 is configured to store the stored information. The timer 154 is configured to notify the processor 151 of the arrival of a set time. In addition, the ECU 150 can acquire a current time by using a real-time clock (RTC) circuit (not shown) built in the ECU 150.

For example, the storage device 153 includes a read only memory (ROM) and a rewritable non-volatile memory. The storage device 153 stores information used in the program (for example, a map, a mathematical formula, and various parameters), in addition to the program. In the present embodiment, the processor 151 executes the program stored in the storage device 153 to execute various controls in the ECU 150. Note that various controls in the ECU 150 are not limited to execution by software, but can also be executed by dedicated hardware (electronic circuit). Note that the number of processors provided in the ECU 150 is optional, and processor may be prepared for each predetermined control.

The vehicle 50 further includes a traveling drive unit 140, an input device 160, a communication device 180, and drive wheels W. Note a drive system of the vehicle 50 is not limited to front wheel driving shown in FIG. 1, and may be rear wheel driving or four-wheel driving.

The traveling drive unit 140 includes a power control unit (PCU) and a motor generator (MG) (none of which are shown), and is configured to drive the vehicle 50 by using the power stored in the battery 130. For example, the PCU includes an inverter, a converter, and a relay (in the following referred to as a "system main relay (SMR)") (none of which are shown). The PCU is controlled by the ECU 150. For example, the MG is a three-phase alternating current motor generator. The MG is driven by the PCU, and is configured to rotate the drive wheels W. The PCU drives the MG by using the power supplied from the battery 130. In addition, the MG is configured to execute regenerative power generation, and supply the generated power to the battery 130. The SMR is configured to switch connection/disconnection of the power path from the battery 130 to the PCU. The SMR is put into the closed state (connected state) when the vehicle 50 travels.

The input device 160 is a device that accepts an input from the user. The input device 160 is operated by the user, and outputs a signal in response to an operation of the user to the ECU 150. Examples of the input device 160 include various switches, various pointing devices, a keyboard, and a touch panel. The input device 160 may include a smart speaker that accepts a voice input.

The communication device 180 includes various communication interfaces (I/Fs). The ECU 150 is configured to communicate with the external device of the vehicle 50 through the communication device 180. The communication device 180 includes a wireless communicator. The wireless communicator may be a data communication module (DCM). The wireless communicator may include a communication I/F compatible with 5th generation mobile communication system (5G). In addition, the communication device 180 includes a communication I/F compatible with the EVSE 40. The ECU 150 is configured to communicate with the control device 43 of the EVSE 40 by wire through the communication device 180. The ECU 150 can communicate with the EVSE 40 by wire via the charging cable 42.

Figure 2:
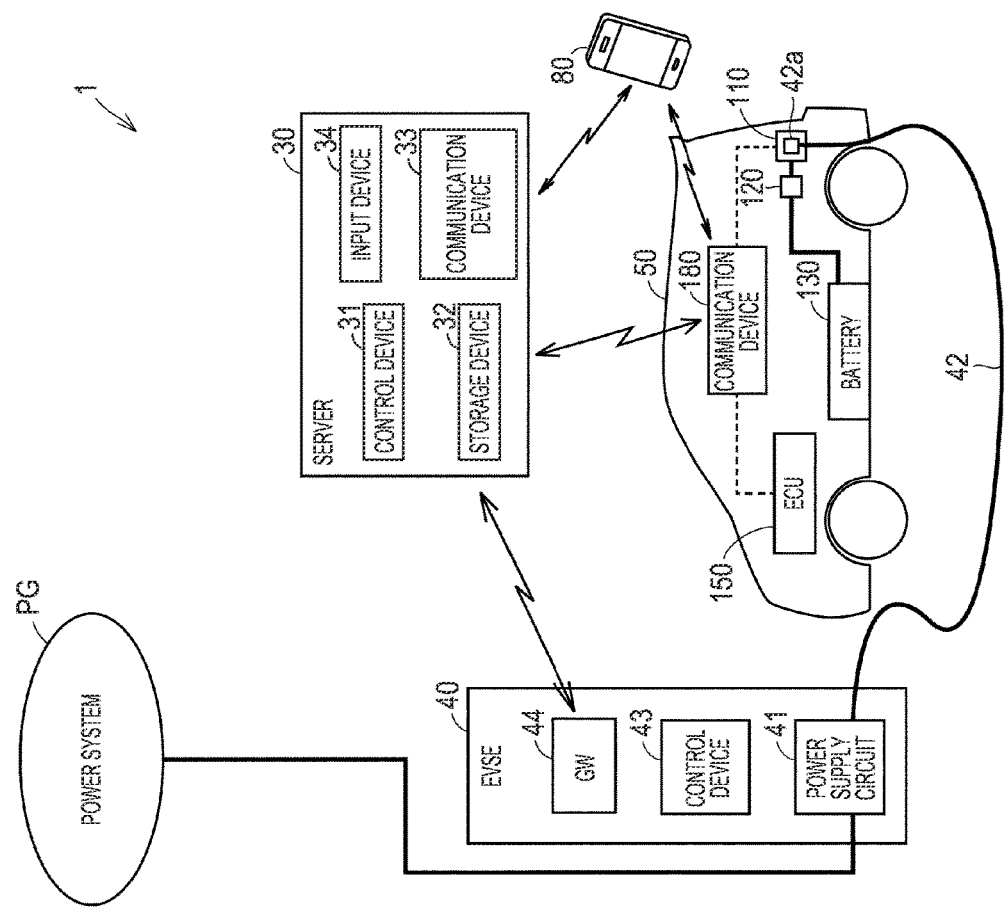
FIG. 2 is a diagram showing the control system according to the first embodiment of the present disclosure.

FIG. 2 is a diagram showing the control system according to the present embodiment. With reference to FIG. 2, a control system 1 includes a server 30, the EVSE 40, the vehicle 50, and a portable terminal 80.

The vehicle 50 has the configuration shown in FIG. 1. In the present embodiment, AC power supply equipment that provides alternating current power is adopted as the EVSE 40. The charger/discharger 120 has a circuit compatible with the AC power supply equipment. Note that the EVSE 40 is not limited to such a form, and may be DC power supply equipment that provides direct current power. The charger/discharger 120 may have a circuit compatible with the DC power supply equipment.

The portable terminal 80 corresponds to a mobile terminal carried by the user of the vehicle 50. In the present embodiment, a smartphone equipped with a touch panel display is adopted as the portable terminal 80. Note that the present disclosure is not limited to this, and any portable terminal can be adopted as the portable terminal 80, and a tablet terminal, a wearable device (for example, a smartwatch), an electronic key, a service tool, or the like can also be adopted.

The EVSE 40 receives the power supplied from a power system PG. The power supply circuit 41 built in the EVSE 40 converts the power supplied from the power system PG into power suitable for external charging. The power supply circuit 41 may include a sensor that detects the charging power. The power system PG is a power network provided by an electricity business company (for example, a power company). The power system PG is electrically connected to a plurality of EVSEs (including the EVSE 40), and supplies the alternating current power to each EVSE.

In the vehicle 50 in the plug-in state, the communication device 180 communicates with the EVSE 40 via the charging cable 42. A communication method between the EVSE 40 and the vehicle 50 is optional, and may be, for example, a controller area network (CAN) or power line communication (PLC). The standard for the communication between the EVSE 40 and the vehicle 50 may be ISO/IEC 15118 or IEC 61851.

The communication device 180 mounted on the vehicle 50 is configured to directly communicate wirelessly with the server 30 through a mobile communication network (telematics), for example. The vehicle 50 can communicate wirelessly with the server 30 in both the plug-in state and a plug-out state. A communication protocol between the server 30 and the vehicle 50 may be OpenADR. The signal exchanged between the communication device 180 and the server 30 may be encrypted. Further, in the present embodiment, the communication device 180 and the portable terminal 80 are configured to communicate wirelessly with each other. The communication between the communication device 180 and the portable terminal 80 may be short-range communication (for example, direct communication in the vehicle and within a range around the vehicle), such as Bluetooth (registered trademark).

Predetermined application software (in the following, simply referred to as "application") is installed in the portable terminal 80. The portable terminal 80 is carried by the user of the vehicle 50, and can exchange information with the server 30 through the application. The user can operate the application through, for example, the touch panel display of the portable terminal 80.

The server 30 includes a control device 31, a storage device 32, a communication device 33, and an input device 34. The control device 31 may be a computer. The control device 31 includes a processor and a storage device, and is configured to execute predetermined information processing and control the communication device 33. The storage device 32 is configured to store various pieces of information. In the present embodiment, in the control device 31, the processor executes the program stored in the storage device, so that various controls in the server 30 are executed. Note that various controls in the server 30 are not limited to execution by software, and can also be executed by dedicated hardware (electronic circuit).

The communication device 33 includes various communication I/Fs. The control device 31 is configured to communicate with the outside through the communication device 33. The input device 34 is a device that accepts an input from the user. The input device 34 outputs the input from the user to the control device 31.

The server 30 is configured to communicate with each of the EVSE 40, the vehicle 50, and the portable terminal 80. In the present embodiment, the server 30 and the EVSE 40 communicate with each other via the Internet. Note that a communication method between the server 30 and the EVSE 40 is not limited to such a method, and can be changed as appropriate. In addition, each of the server 30 and the EVSE 40 may be configured to communicate with the EVSE management cloud. The communication protocol may be an open charge point protocol (OCPP).

In the present embodiment, a plurality of vehicles (including the vehicle 50) managed by the server 30 functions as a virtual power plant (VPP). Specifically, the VPP is realized by energy management using a plurality of electrified vehicles (xEVs) managed by the server 30. Each xEV managed by the server 30 may be the BEV having the configuration shown in FIG. 1.

Figure 3:
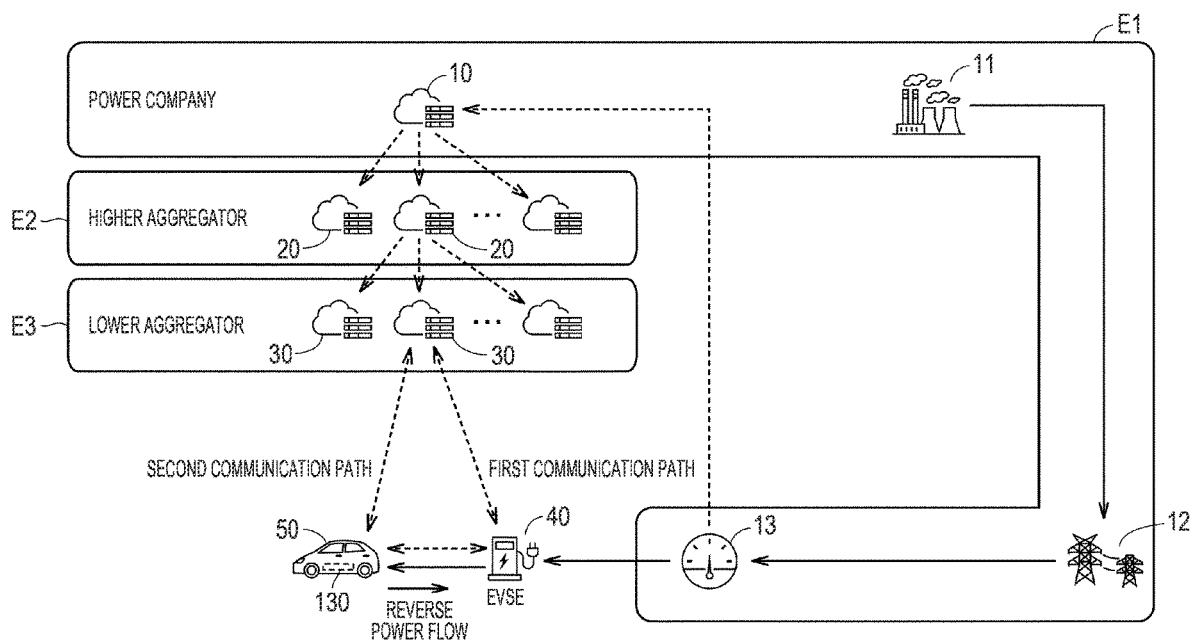
FIG. 3 is a diagram showing a schematic configuration of a power system according to the first embodiment of the present disclosure.

FIG. 3 is a diagram showing a schematic configuration of a power system according to the present embodiment. The power system shown in FIG. 3 is a vehicle grid integration (VGI) system. The power system includes the xEVs and the EVSEs (solely one of each is shown in FIG. 3). The number of xEVs and the number of EVSEs provided in the power system are optional independently of each other, and may be equal to or more than 10, or may be equal to or more than 100. Each xEV in the power system functions as distributed energy resources (DER). The power system may further include a DER (not shown) other than the xEV.

With reference to FIG. 3 together with FIGS. 1 and 2, the power system includes a power company E1, a higher aggregator E2 that contacts the power company E1, and a lower aggregator E3 that contacts the xEV and the EVSE (for example, the vehicle 50 and the EVSE 40). The electricity business company that bundles a plurality of DERs to provide energy management services is called an "aggregator".

The power company E1 also serves as a power generation company and a power transmission and distribution company. The power company E1 constructs the power network (that is, the power system PG shown in FIG. 2) by a power plant 11 and power transmission and distribution equipment 12, and maintains and manages the power system PG by the server 10 and a smart meter 13. The power plant 11 is provided with a power generation device that generates electricity, and is configured to supply the power generated by the power generation device to the power transmission and distribution equipment 12. A power generation method of the power plant 11 is optional. The power transmission and distribution equipment 12 includes a transmission line, a substation, and a distribution line, and is configured to execute transmission and distribution of the power supplied from the power plant 11. The smart meter 13 is configured to measure a usage amount of power for each predetermined time, store the measured usage amount of power, and transmit the measured usage amount of power to the server 10. The smart meter 13 is provided for each consumer (for example, an individual or a company) who uses the power. The server 10 acquires the usage amount of power from each consumer from the smart meter 13 of each consumer. The power company E1 may receive an electricity charge depending on the usage amount of power from each consumer.

The power company E1 can adjust the power of the power system PG by cooperating with the aggregator, for example. The higher aggregator E2 includes a plurality of servers 20. The lower aggregator E3 includes a plurality of servers 30. The server 30 in FIG. 3 is the same as the server 30 in FIG. 2. The number of servers 20 and the number of servers 30 are optional independently of each other, and may be equal to or more than 5, or may be equal to or more than 30.

In the present embodiment, one server 10 requests the energy management from the servers 20, and each server 20 that receives the request from the server 10 requests the energy management from the servers 30. Further, each server 30 that receives the request from the server 20 requests the energy management from the xEVs. The power company E1 can request the energy management from many consumers (for example, the user of the xEV) by using such a hierarchical structure (tree structure). The request may be made by demand response (DR).

When the server 30 receives the request for energy management from the server 20, the server 30 selects a needed number of VPP cooperation vehicles to respond to the request. The VPP cooperation vehicle is the xEV that cooperates with the energy management. The VPP cooperation vehicle is selected from among the xEVs belonging to the user who has signed a contract with the aggregator in advance. The user who has signed the contract can receive a predetermined incentive by executing charging/discharging in response to the request from the aggregator. In addition, the user who approves to respond to the request but does not respond to the request is subject to a predetermined penalty by the contract.

In the present embodiment, when the selection of the VPP cooperation vehicle is terminated, the server 30 transmits a charging/discharging command (more specifically, a command to cause the VPP cooperation vehicle to execute charging/discharging control) to each VPP cooperation vehicle. The energy management (for example, supply and demand adjustment of the power system PG) in response to the request from the server 20 is executed by the charging/discharging command.

In the power system shown in FIG. 3, each xEV has a plurality types of communication paths (in the present embodiment, a first communication path and a second communication path) as communication paths used for the communication with the server 30. That is, the server 30 is configured to communicate with each xEV via the communication paths. When the server 30 causes the VPP cooperation vehicle to execute the energy management requested by the server 20, the server 30 selects any one of the first communication path and the second communication path based on a state of the VPP cooperation vehicle, and transmits the charging/discharging command to the VPP cooperation vehicle by using the selected communication path.

The first communication path is a communication path through which a signal is transmitted from the server 30 to the xEV (for example, the vehicle 50) via the electric vehicle supply equipment (for example, the EVSE 40). In a case where the server transmits the charging/discharging command to the vehicle 50 by using the first communication path, the charging/discharging command is transmitted from the server 30 to the vehicle 50 via the Internet and the EVSE 40 (the charging cable 42, the control device 43, and the GW 44).

The second communication path is a communication path through which a signal is transmitted from the server 30 to the xEV (for example, the vehicle 50) by the wireless communication. In a case where the server 30 transmits the charging/discharging command to the vehicle 50 by using the second communication path, the charging/discharging command is directly transmitted from the server 30 to the vehicle 50 by the wireless communication. The vehicle 50 receives the charging/discharging command from the second communication path by the wireless communicator (for example, the DCM) provided in the communication device 180.

By transmitting the charging/discharging command to the VPP cooperation vehicle, the server 30 can remotely control at least one of charging and discharging of the power storage device mounted on the VPP cooperation vehicle. In the following, the remote control of the vehicle 50 by the server 30 in a case where the vehicle 50 is selected as the VPP cooperation vehicle will be described.

The server 30 selects any one of the first communication path and the second communication path as the communication path used for the communication with the vehicle 50, for example, based on a diagnosis result described below (for example, see S24 in FIG. 5). Moreover, the server 30 transmits the charging/discharging command to the vehicle 50 in the plug-in state by using the selected communication path. The vehicle 50 executes charging/discharging of the battery 130 in response to the charging/discharging command received from the server 30. The vehicle 50 can increase the power demand of the power system PG by executing external charging by using the EVSE 40. In addition, the vehicle 50 can execute reverse power flow to the power system PG by executing external power supply by using the EVSE 40. The details will be described below, but the diagnosis result is information indicating the state of the vehicle 50, and more specifically, indicating whether or not each of the first and second communication paths through which the vehicle 50 communicates with the server 30 is under the cyberattack. In a case where any one of the first and second communication paths is under the cyberattack, the server 30 transmits the charging/discharging command to the vehicle 50 by using the communication path that is not under the cyberattack. In the present embodiment, a communication speed of the first communication path is faster than a communication speed of the second communication path. In a case where both the first and second communication paths are not under the cyberattack, the server 30 basically transmits the charging/discharging command to the vehicle 50 by using the first communication path. Note that, in a stable period (see FIG. 7) described below, the server 30 alternately uses the first communication path and the second communication path. In the present embodiment, the server 30 corresponds to an example of a "computer" according to the present disclosure.

Figure 4:
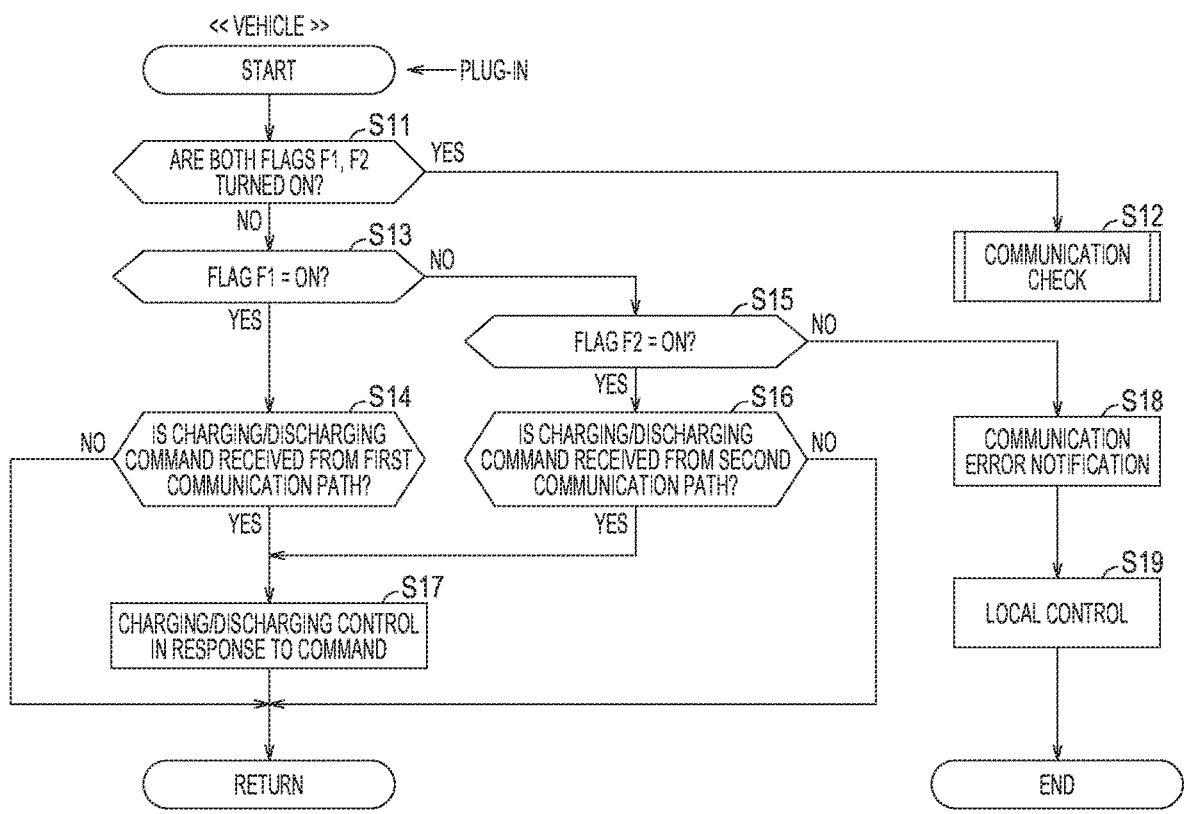
FIG. 4 is a flowchart showing processing related to a charging/discharging control executed by a control device of the vehicle according to the first embodiment of the present disclosure.

FIG. 4 is a flowchart showing processing related to the charging/discharging control executed by the ECU 150 of the vehicle 50. The processing shown in the flowchart is started when the vehicle 50 is put into the plug-in state. While the processing shown in FIG. 4 is executed, the plug-out is prohibited, for example, by locking the connector connected to the inlet 110 of the vehicle 50. In the present embodiment, the ECU 150 functions as an example of a "determination unit" according to the present disclosure. In the following, each step in the flowchart is simply referred to as "S".

With reference to FIG. 4 together with FIGS. 1 to 3, in S11, the ECU 150 determines whether or not both flags F1, F2 are set to ON. Each of the flags F1, F2 is set to ON in an initial state (for example, a state at the time of shipment). Note that when the cyberattack or a failure of the communication system occurs, at least one of the flags F1, F2 is set to OFF (see S26 in FIG. 5 described below). In a case where both the flags F1, F2 are set to ON (YES in S11), the processing proceeds to S12. In S12, the processing shown in FIG. 5 described below is executed.

Figure 5:
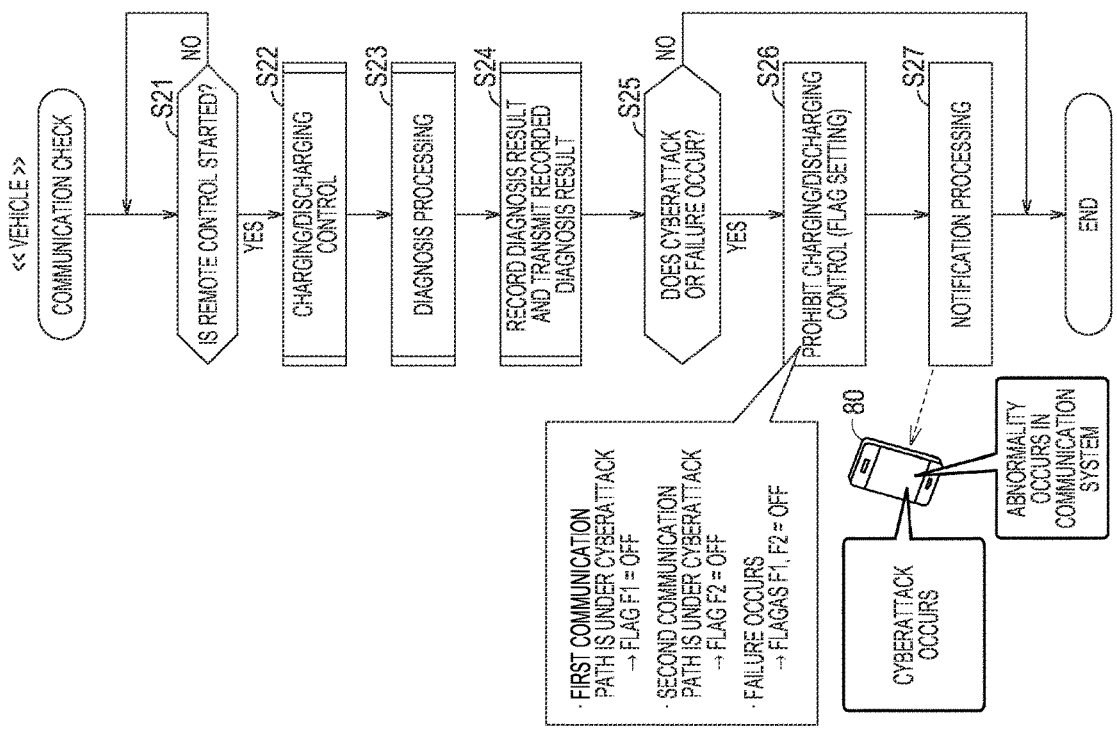
FIG. 5 is a flowchart showing details of a communication check shown in FIG. 4.
Figure 6:
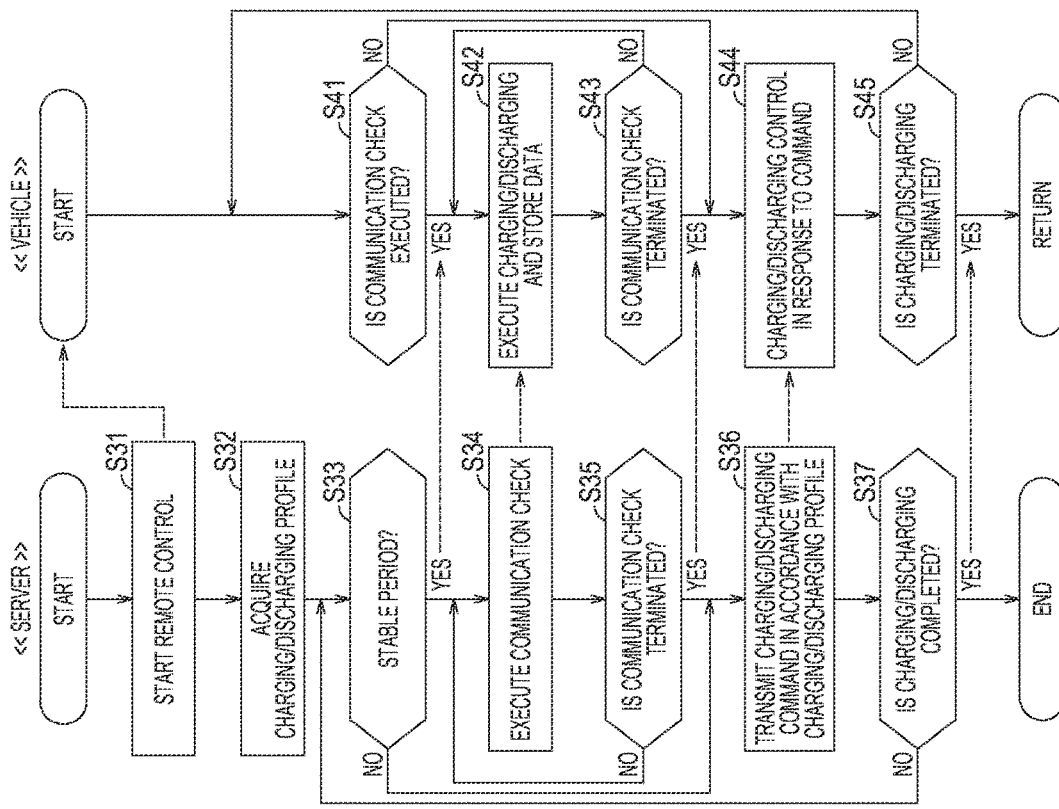
FIG. 6 is a flowchart showing details of the charging/discharging control in the communication check shown in FIG. 5.

FIG. 5 is a flowchart showing the details of a communication check in S12 of FIG. 4. With reference to FIG. 5 together with FIGS. 1 to 3, in S21, the ECU 150 determines whether or not the remote control of the vehicle 50 by the server 30 is started. Moreover, when the remote control is started (YES in S21), the processing proceeds to S22. In S22, the ECU 150 executes the charging/discharging control. FIG. 6 is a flowchart showing details of the processing related to the charging/discharging control in S22 of FIG. 5.

With reference to FIG. 6 together with FIGS. 1 to 3, the server 30 notifies the vehicle 50 of the start of remote control in S31, and then acquires a charging/discharging profile related to the charging/discharging control of the current time in S32. When the server 30 receives the request for the energy management from the server 20, the server 30 may decide the charging/discharging profile for each VPP cooperation vehicle to respond to the request from the server 20, and may store the decided charging/discharging profile in the storage device 32. In S32, the control device 31 may read the charging/discharging profile for the vehicle 50 out of the storage device 32.

In S33, the server 30 determines whether or not a current timing in the charging/discharging profile belongs to the stable period (that is, a period in which the charging/discharging power is fixed). In a case where the current timing does not belong to the stable period (NO in S33), the server 30 transmits in S36 the charging/discharging command in accordance with the charging/discharging profile to the vehicle 50 via the first communication path, and determines in S37 whether or not charging/discharging in accordance with the charging/discharging profile is completed. Moreover, in a case where charging/discharging is not completed (NO in S37), the processing returns to S33.

On the other hand, when the vehicle 50 receives a remote control start notification (S31), a determination is made as YES in S21 shown in FIG. 5, and the processing of the vehicle 50 shown in FIG. 6 is started. In S41, the ECU 150 determines whether or not the communication check described below is started. In a case where a determination is made as NO in S33, since the communication check by the server 30 is not executed, a determination is made as NO in S41, and the processing proceeds to S44.

In S44, the ECU 150 controls the charger/discharger 120 in response to the charging/discharging command (S36) received from the server 30. As a result, the charging/discharging control (remote control) of the battery 130 is executed by the remote control. Note that when a remaining amount of the battery 130 becomes zero during discharging, or when the battery 130 becomes fully charged during charging, the ECU 150 transmits a charging/discharging stop request to the server 30. In this case, a determination is made as YES in S37, and the remote control by the server 30 is stopped.

In subsequent S45, the ECU 150 determines whether or not the charging/discharging in accordance with the charging/discharging profile is terminated. In a case where a determination is made as NO in S37, since the charging/discharging control (remote control) by the server 30 is not completed, a determination is made as NO in S45, and the processing returns to S41.

In a case where the current timing in the charging/discharging profile belongs to the stable period (YES in S33), the control device 31 of the server 30 starts the communication check in S34. In this case, the server 30 transmits a signal indicating that the communication check is started (in the following, also referred to as a "check start signal") to the vehicle 50. Moreover, the control device 31 continues the communication check in S34 while a determination is made as NO (communication check is not terminated) in S35.

On the other hand, when the vehicle 50 receives the check start signal from the server 30, the ECU 150 makes a determination as YES in S41. Moreover, in S42, the ECU 150 executes charging/discharging of the battery 130, and records predetermined data in the storage device 153. Moreover, the ECU 150 continues charging/discharging of the battery 130 and recording of the data in S42 while a determination is made as NO (communication check is not terminated) in S43.

Figure 7:
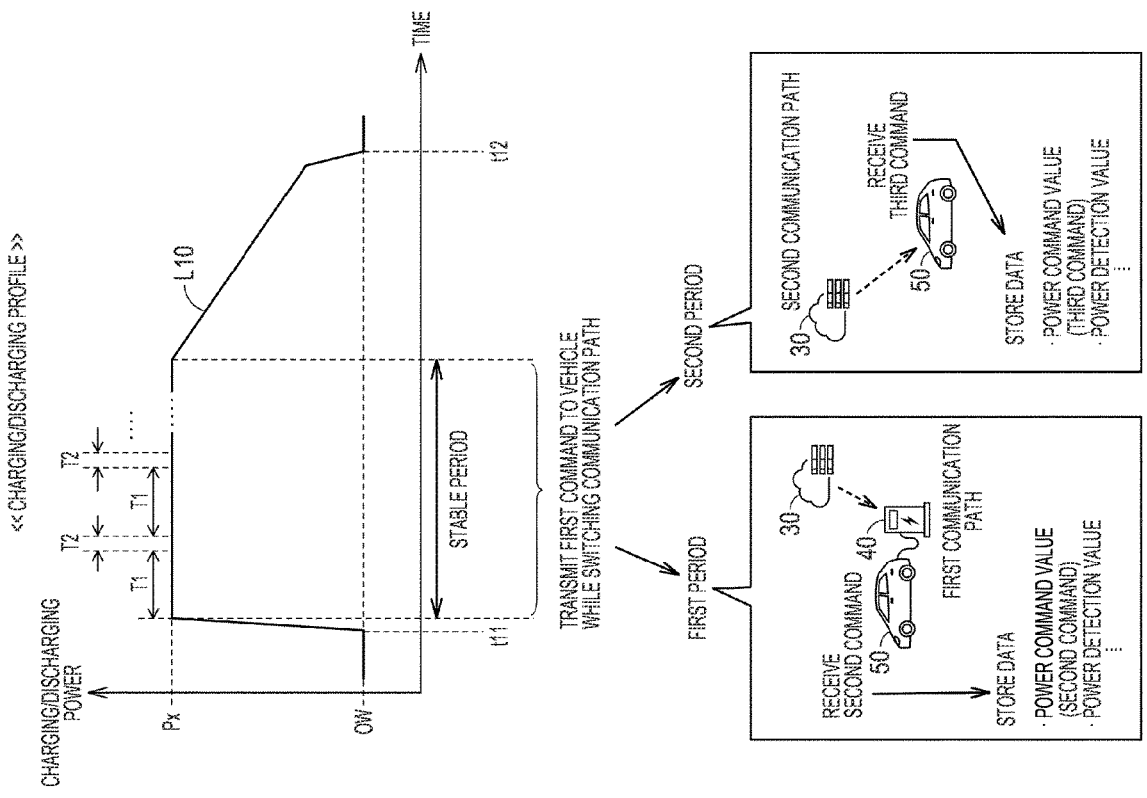
FIG. 7 is a diagram for describing the communication check executed by the processing shown in FIG. 6.

FIG. 7 is a diagram for describing the communication check executed by the processing shown in FIG. 6. In FIG. 7, a line L10 shows an example of the charging/discharging profile. The charging/discharging profile is a charging profile or a discharging profile. In a case where the charging/discharging profile indicated by the line L10 is the charging profile, the charging/discharging power on a vertical axis represents the charging power. In a case where the charging/discharging profile indicated by the line L10 is the discharging profile, the charging/discharging power on the vertical axis represents the discharging power.

With reference to FIG. 7 together with FIG. 6, in the charging/discharging profile indicated by the line L10, the charging/discharging (charging or discharging) is started at timing t11, and after the stable period in which the charging/discharging power is maintained at fixed power (power Px) passes, charging/discharging is terminated at timing t12. When the charging/discharging is started at timing t11, the charging/discharging power is increased, and when the charging/discharging power reaches the power Px, the timing enters the stable period. Moreover, when the stable period is terminated, since the charging/discharging power starts to be decreased, the charging/discharging power becomes 0 W at timing t12, and the charging/discharging is terminated.

In the period that does not correspond to the stable period, the server 30 transmits the charging/discharging command indicating the power value indicated by the charging/discharging profile to the vehicle 50 via the first communication path by the processing of S36 in FIG. 6, and the vehicle 50 executes charging/discharging of the battery 130 in response to the charging/discharging command in S44 of FIG. 6. As described above, the server 30 remotely controls the charging/discharging of the battery 130 mounted on the vehicle 50.

In the stable period, the server 30 transmits the charging/discharging command in accordance with the charging/discharging profile to the vehicle 50 by the processing of S34 in FIG. 6. Note that, in S34, a first command indicating maintaining of the charging/discharging power (charging power or discharging power) at the power Px is transmitted to the vehicle 50 via each of the first communication path and the second communication path. Specifically, the stable period includes a first period T1 in which the server 30 transmits the first command to the vehicle 50 via the first communication path (that is, the path including the EVSE 40), and a second period T2 in which the server transmits the first command to the vehicle 50 via the second communication path (that is, the path excluding the EVSE 40).

In the present embodiment, the second period T2 is shorter than the first period T1. A length of the second period T2 may be equal to or less than half a length of the first period T1. In the present embodiment, the first period T1 and the second period T2 are alternately repeated in the stable period. Note that the present disclosure is not limited to this, and each of the first period T1 and the second period T2 may be present once in the stable period.

In the following, when the server 30 transmits the first command to the vehicle 50 via the first communication path, the charging/discharging command received by the vehicle 50 via the first communication path is referred to as a "second command". In addition, when the server 30 transmits the first command to the vehicle 50 via the second communication path, the charging/discharging command received by the vehicle 50 via the second communication path is referred to as a "third command".

For example, in a case where the charging/discharging profile indicated by the line L10 is the charging profile, the first period T1 and the second period T2 correspond to a first charging period and a second charging period, respectively. In the first charging period, the first command is transmitted from the server 30 to the vehicle 50 via the first communication path (S34 in FIG. 6), and the vehicle 50 executes charging of the battery 130 in response to the second command (S42 in FIG. 6). In this case, the ECU 150 detects the charging power (first power) of the battery 130 when charging in response to the second command is executed. Moreover, in the first charging period, the ECU 150 continuously records the power indicated by the second command, a detection value (first power) of the charging power, and an acquisition time (time stamp) in the storage device 153. In the second charging period, the first command is transmitted from the server 30 to the vehicle 50 via the second communication path (S34 in FIG. 6), and the vehicle 50 executes charging of the battery 130 in response to the third command (S42 in FIG. 6). In this case, the ECU 150 detects the charging power (second power) of the battery 130 when charging in response to the third command is executed. Moreover, in the second charging period, the ECU 150 continuously records the power indicated by the third command, the detection value (second power) of the charging power, and the acquisition time (time stamp) in the storage device 153.

As described above, the server 30 executes the charging control of the battery 130 such that the first charging period and the second charging period are included in one charging of the battery 130 (period from timing t11 to timing t12). Moreover, the vehicle 50 executes charging of the battery 130 and recording of charging data in each of the first and second charging periods. The recorded charging power includes, for example, a charging current and a charging voltage detected by the monitoring module 121. In a case where the charging voltage is fixed, the ECU 150 may record solely the charging current.

In a case where the charging/discharging profile indicated by the line L10 is the discharging profile, the first period T1 and the second period T2 correspond to the first discharging period and the second discharging period, respectively. In the first discharging period, the first command is transmitted from the server 30 to the vehicle 50 via the first communication path (S34 in FIG. 6), and the vehicle 50 executes discharging of the battery 130 in response to the second command (S42 in FIG. 6). In this case, the ECU 150 detects the discharging power (first power) of the battery 130 when discharging in response to the second command is executed. Moreover, in the first discharging period, the ECU 150 continuously records the power indicated by the second command, the detection value (first power) of the discharging power, and the acquisition time (time stamp) in the storage device 153 (S42 in FIG. 6). In the second discharging period, the first command is transmitted from the server 30 to the vehicle 50 via the second communication path (S34 in FIG. 6), and the vehicle 50 executes discharging of the battery 130 in response to the third command (S42 in FIG. 6). In this case, the ECU 150 detects the discharging power (second power) of the battery 130 when discharging in response to the third command is executed. Moreover, in the second discharging period, the ECU 150 continuously records the power indicated by the third command, the detection value (second power) of the discharging power, and the acquisition time (time stamp) in the storage device 153 (S42 in FIG. 6).

As described above, the server 30 executes the discharging control of the battery 130 such that the first discharging period and the second discharging period are included in one discharging of the battery 130 (period from timing t11 to timing t12). Moreover, the vehicle 50 executes discharging of the battery 130 and recording of discharging data in each of the first and second discharging periods. The recorded discharging power includes, for example, a discharging current and a discharging voltage detected by the monitoring module 121. In a case where the discharging voltage is fixed, the ECU 150 may record solely the discharging current.

The data recorded in the stable period will be used in the diagnosis processing described below. With reference to FIG. 6 together with FIGS. 1 to 3, when the stable period is terminated, a determination is made as YES (communication check is terminated) in each of S35, S43. Moreover, even after the stable period of the charging/discharging profile, the charging/discharging (remote control) of the battery 130 is executed by the processing of S36 executed by the control device 31 and the processing of S44 executed by the ECU 150. When charging/discharging proceeds to timing t12 shown in FIG. 7 and the charging/discharging profile is terminated, the control device 31 of the server 30 makes a determination as YES (charging/discharging is completed) in S37. In this case, the server 30 transmits a signal indicating that charging/discharging is terminated (in the following, also referred to as a "charging/discharging termination signal") to the vehicle 50. Thereafter, the server 30 terminates a series of processing shown in FIG. 6. In the present embodiment, the server 30 transmits the charging/discharging command to the vehicle 50 by using the first communication path having a high communication speed in the period that does not correspond to the stable period. However, the present disclosure is not limited to this, and the server 30 may use the second communication path instead of the first communication path. In addition, the charging/discharging profile shown in FIG. 7 is merely an example and can be changed as appropriate.

Figure 8:
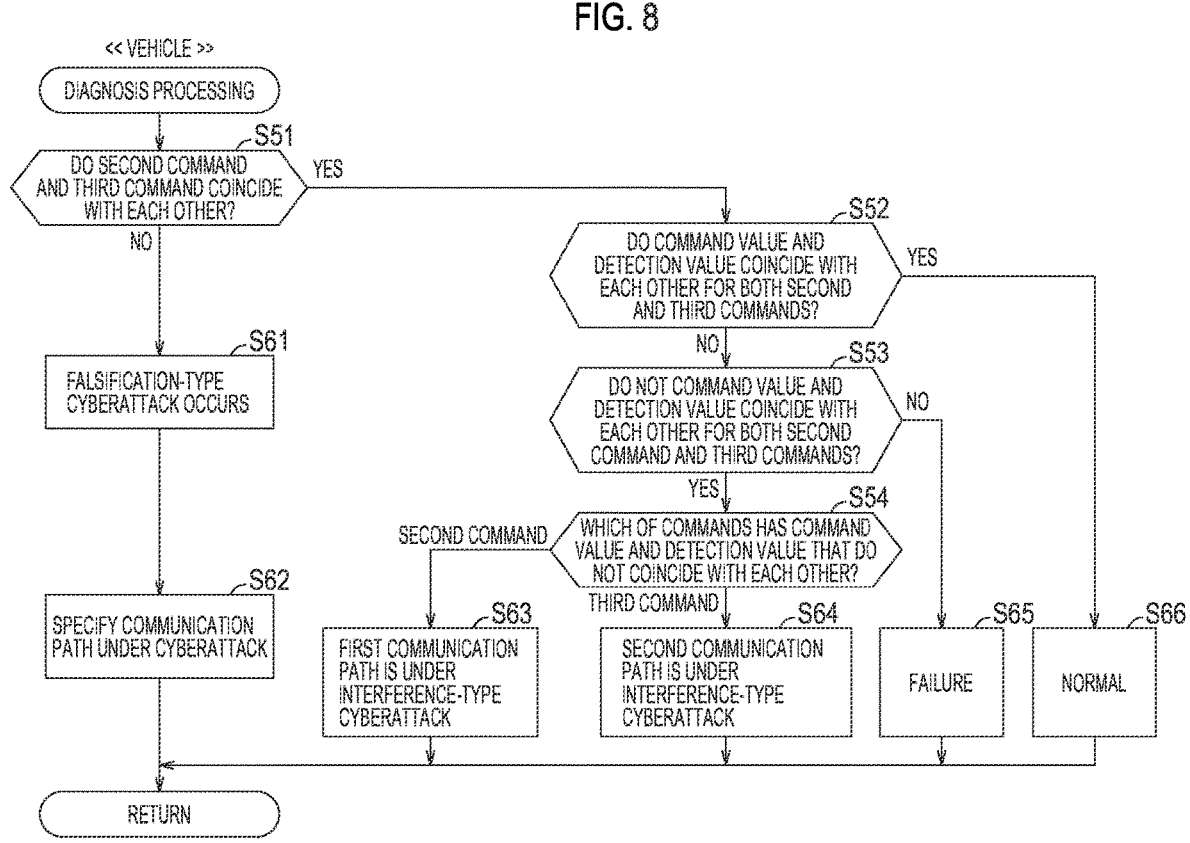
FIG. 8 is a flowchart showing details of diagnosis processing shown in FIG. 5.

When the vehicle 50 receives the charging/discharging termination signal from the server 30, the ECU 150 makes a determination as YES (charging/discharging is terminated) in S45. As a result, the processing of S22 shown in FIG. 5 is terminated, and the processing by the vehicle 50 proceeds to S23 of FIG. 5. In S23 of FIG. 5, the ECU 150 executes the diagnosis processing by using the data recorded in the stable period. FIG. 8 is a flowchart showing the details of the diagnosis processing in S23 of FIG. 5.

With reference to FIG. 8 together with FIGS. 1 to 3, in S51, the ECU 150 determines whether or not the second command and the third command recorded in S42 of FIG. 6 coincide with each other. In this case, in order to match the timings of the second command and the third command, the ECU 150 executes time correction based on a difference between the communication speed of the first communication path and the communication speed of the second communication path. In addition, the ECU 150 also executes the same time correction for the first power and the second power described below. Such time correction may be executed when the data is recorded (S42 in FIG. 6).

In a case where a deviation between the second command and the third command is within a predetermined allowable range, a determination is made as YES in S51. On the other hand, in a case where the deviation between the second command and the third command is beyond the predetermined allowable range, a determination is made as NO in S51. For example, in a case where the ECU 150 compares the charging/discharging profile indicated by the second command and the charging/discharging profile indicated by the third command, when at least one of the deviation of time and the deviation of power value is beyond the allowable range, a determination is made as NO in S51.

Moreover, in a case where the second command and the third command do not coincide with each other (NO in S51), the ECU 150 determines in S61 that the any one of the first communication path and the second communication path is under the falsification-type cyberattack, and specifies in S62 which of the first communication path and the second communication path is under the falsification-type cyberattack by using the first power and the second power.

Specifically, in S62, for the charging/discharging profile (that is, the detected charging/discharging profile) indicated by each of the first power (detection value of the charging power or the discharging power) at the time of charging/discharging by using the first communication path, and the second power (detection value of the charging power or the discharging power) at the time of charging/discharging by using the second communication path, the ECU 150 specifies which of the charging/discharging profiles does not follow the command. Moreover, the ECU 150 determines that the communication path corresponding to the charging/discharging profile that does not follow the command is under the cyberattack.

For example, in a case where the charging/discharging power in the stable period is too higher or too lower than a predetermined reference power value, the ECU 150 may determine that the charging/discharging profile does not follow the command. In addition, in a case where the charging/discharging power is not stable in the stable period, the ECU 150 may determine that the charging/discharging profile does not follow the command. In addition, in a case where the start of charging/discharging is too earlier or too later than a predetermined first reference timing, the ECU 150 may determine that the charging/discharging profile does not follow the command. In addition, in a case where the termination of charging/discharging is too earlier or too later than a predetermined second reference timing, the ECU 150 may determine that the charging/discharging profile does not follow the command. Note that each of the reference power value, the first reference timing, and the second reference timing may be stored in the storage device 153 in advance, or may be decided from a charging/discharging history.

In a case where the second command and the third command coincide with each other (YES in S51), in S52 to S54, the ECU 150 determines whether or not the command value (power indicated by the second command or the third command) and the detection value (the first power or the second power) coincide with each other for each of the second command and the third command recorded in S42 in FIG. 6.

In a case where the command value and the detection value coincide with each other for both the second command and the third command, a determination is made as YES in S52, and the processing proceeds to S66. The fact that a determination is made as YES in S52 means that the second command and the third command coincide with each other, the power indicated by the second command and the first power coincide with each other, and the power indicated by the third command and the second power coincide with each other. In S66, the ECU 150 determines that charging/discharging in accordance with the charging/discharging profile is normally executed. The fact that charging/discharging is normally executed means that each of the first and second communication paths is not under the cyberattack, and the failure occurs in a communication system of the vehicle 50.

In a case where the command value and the detection value do not coincide with each other for both the second command and the third command, a determination is made as NO in S53, and the processing proceeds to S65. The fact that a determination is made as NO in S53 means that the second command and the third command coincide with each other, the power indicated by the second command and the first power do not coincide with each other, and the power indicated by the third command and the second power do not coincide with each other. In S65, the ECU 150 determines that the failure occurs in the vehicle 50 (particularly, the communication system).

In a case where the command value and the detection value do not coincide with each other solely for the second command among the second command and the third command, a determination is made as the "second command" in S54, and the processing proceeds to S63. The fact that a determination is made as the "second command" in S54 means that the second command and the third command coincide with each other, the power indicated by the second command and the first power do not coincide with each other, and the power indicated by the third command and the second power coincide with each other. In S63, the ECU 150 determines that the first communication path is under the interference-type cyberattack.

In a case where the command value and the detection value do not coincide with each other solely for the third command among the second command and the third command, a determination is made as the "third command" in S54, and the processing proceeds to S64. The fact that a determination is made as the "third command" in S54 means that the second command and the third command coincide with each other, the power indicated by the second command and the first power coincide with each other, and the power indicated by the third command and the second power do not coincide with each other. In S64, the ECU 150 determines that the second communication path is under the interference-type cyberattack.

When the diagnosis result is obtained by any one of the processing of S62 to S66, a series of processing shown in FIG. 8 is terminated, and the processing proceeds to S24 in FIG. 5. With reference to FIG. 5 together with FIGS. 1 to 3 again, in S24, the ECU 150 records the diagnosis result obtained in S23 (processing shown in FIG. 8) in the storage device 153 and transmits the recorded diagnosis result to the server 30. In this case, the ECU 150 transmits the diagnosis result to the server 30 by using the communication path that is not under the cyberattack. The server 30 records the diagnosis result of each vehicle in the storage device 32 separately by a vehicle ID, and sequentially updates the recorded diagnosis result. The information recorded in the storage device 153 in the vehicle 50 (particularly, the information on the failure) may be used in on-board diagnostic (OBD).

In subsequent S25, the ECU 150 determines whether or not the cyberattack or the failure occurs in the vehicle 50 based on the data recorded in S24. In a case where any one of the cyberattack and the failure occurs, a determination is made as YES in S25, and the processing proceeds to S26. Specifically, by the processing shown in FIG. 8, in cases where a diagnosis is made that the first or second communication path is under the falsification-type cyberattack (S61, S62), a diagnosis is made that the first communication path is under the interference-type cyberattack (S63), a diagnosis is made that the second communication path is under the interference-type cyberattack (S64), and a diagnosis is made that the failure occurs (S65), a determination is made as YES in S25. On the other hand, in a case where both the cyberattack and the failure do not occur, a determination is made as NO in S25, and a series of processing shown in FIG. 5 is terminated. Specifically, in a case where a diagnosis is made as normal (S66) by the processing shown in FIG. 8, a determination is made as NO in S25.

In S26, the ECU 150 sets the flags F1, F2 such that charging/discharging is prohibited in accordance with the diagnosis result. Specifically, in a case where a determination is made by the processing shown in FIG. 8 that the first communication path is under the cyberattack (S62, S63), the ECU 150 sets the flag F1 to OFF in S26. In a case where a determination is made that the second communication path is under the cyberattack (S62, S64), the ECU 150 sets the flag F2 to OFF in S26. In a case where a diagnosis is made that the failure occurs (S65), the ECU 150 sets both the flags F1, F2 to OFF in S26. Note that, in a case where the ECU 150 cannot specify which of the first communication path and the second communication path is under the cyberattack in S62 of FIG. 8, the ECU 150 may set both the flags F1, F2 to OFF in S26 of FIG. 5.

In subsequent S27, the ECU 150 executes notification processing with respect to the user of the vehicle 50. The ECU 150 causes the touch panel display of the portable terminal 80 carried by the user to display a predetermined message, for example. The notification processing is not limited to display, and may be executed by voice. The ECU 150 may cause another notification device (for example, a meter panel, a head-up display, a navigation display, a warning light, or a speaker) to execute the notification processing instead of the portable terminal 80. By executing the processing of S27, a series of processing shown in FIG. 5 is terminated.

With reference to FIG. 4 together with FIGS. 1 to 3 again, in a case where both the flags F1, F2 are set to ON (YES in S11), the communication check as described above is executed in S12. On the other hand, in a case where at least one of the flags F1, F2 is set to OFF (NO in S11), the processing proceeds to S13.

In S13, the ECU 150 determines whether or not the flag F1 is set to ON. In a case where the flag F1 is set to ON (YES in S13), the processing proceeds to S14. The fact that the flag F1 is set to ON means that the ECU 150 (determination unit) determines that the first communication path is not under the cyberattack. In S14, the ECU 150 determines whether or not the charging/discharging command is received from the first communication path.

In a case where the flag F1 is set to OFF (NO in S13), the processing proceeds to S15. In S15, the ECU 150 determines whether or not the flag F2 is set to ON. In a case where the flag F2 is set to ON (YES in S15), the processing proceeds to S16. The fact that the flag F2 is set to ON means that the ECU 150 (determination unit) determines that the second communication path is not under the cyberattack. In S16, the ECU 150 determines whether or not the charging/discharging command is received from the second communication path.

In a case where the ECU 150 receives the charging/discharging command from the communication path that is not under the cyberattack (YES in S14 or S16), the ECU 150 controls the charger/discharger 120 in S17 in response to the charging/discharging command. As a result, the charging/discharging control (remote control) of the battery 130 is executed by the remote control. On the other hand, in a case where the ECU 150 does not receive the charging/discharging command (NO in S14 or S16), the processing returns to first step (S11).

In a case where the ECU 150 (determination unit) determines that the first communication path is under the cyberattack, the flag F1 is set to OFF. In a case where the flag F1 is set to OFF (NO in S13), the processing does not proceed to S14. As a result, charging/discharging of the battery 130 in response to the command received by the vehicle 50 via the first communication path is prohibited. In addition, in a case where the ECU 150 (determination unit) determines that the second communication path is under the cyberattack, the flag F2 is set to OFF. In a case where the flag F2 is set to OFF (NO in S15), the processing does not proceed to S16. As a result, charging/discharging of the battery 130 in response to the command received by the vehicle 50 via the second communication path is prohibited. With such a configuration, it is possible to suppress the execution of the remote control of the vehicle 50 by using the communication path under the cyberattack.

In a case where both the flags F1, F2 are set to OFF (NO in S15), the processing proceeds to S18. In S18, the ECU 150 notifies the server 30 that a communication error occurs in the vehicle 50. In subsequent S19, the ECU 150 is set such that charging/discharging is executed by local control instead of remote control. Thereafter, a series of processing shown in FIG. 4 is terminated. As a result, the ECU 150 executes a predetermined charging/discharging control (local control). In the present embodiment, the ECU 150 executes the charging/discharging control described below.

The ECU 150 executes immediate charging and timer charging, for example. Specifically, the ECU 150 starts external charging (immediate charging) in a case where the vehicle 50 is put into the plug-in state when timer charging is not set. In addition, the user of the vehicle 50 can operate the input device 160 or the portable terminal 80 to set the timer charging in the vehicle 50 (more specifically, the ECU 150). The timer charging is set in the vehicle 50 by the user designating a start time and reserving the charging. In the vehicle 50 in the plug-in state, when the set start time of timer charging arrives, the ECU 150 starts timer charging. In addition, the user of the vehicle 50 can operate the input device 160 or the portable terminal 80 to instruct the vehicle 50 (more specifically, the ECU 150) to execute the external power supply. The vehicle 50 in the plug-in state executes the external power supply in response to the instruction from the user.

In a case where both the flags F1, F2 are set to OFF, there is a high possibility that the remote control by the server 30 is not appropriately executed, so solely charging/discharging by the local control is permitted. Note that ECU 150 may be configured to execute a predetermined inspection for charging/discharging by the local control, and prohibit charging/discharging by the local control in a case where the charger/discharger 120 has the failure.

As described above, the control system 1 according to the first embodiment includes the server 30 that remotely controls charging and discharging of the battery 130 mounted on the vehicle 50 (control target). The server 30 is configured to transmit the first command indicating the charging power or the discharging power of the battery 130 to the vehicle 50 via each of the first communication path and the second communication path. The control system 1 further includes the ECU 150 (including the determination unit) mounted on the vehicle 50. The ECU 150 determines whether or not any one of the first communication path and the second communication path is under the cyberattack by using the second command received by the vehicle 50 via the first communication path when the server 30 transmits the first command, and the third command received by the vehicle 50 via the second communication path when the server transmits the first command. Specifically, the ECU 150 determines whether or not any one of the first communication path and the second communication path is under the cyberattack by the processing shown in FIG. 8. By using the second command and the third command, it is possible for the ECU 150 to easily and accurately determine whether or not any one of the first communication path and the second communication path is under the cyberattack.

The processing shown in FIG. 8 detects the failure of the communication system of the vehicle 50, but the detection of the failure is not always needed. The processing shown in FIG. 8 detects both the falsification-type cyberattack and the interference-type cyberattack, but may be changed to solely detect any one of the falsification-type cyberattack and the interference-type cyberattack. For example, solely the falsification-type cyberattack may be detected in solely in S51, S61, S62. In addition, when a detection is made in S61 that the falsification-type cyberattack occurs, the processing shown in FIG. 8 may be terminated without specifying the communication path under the attack. In a case where any one of the first communication path and the second communication path is under the cyberattack, both the flags F1, F2 may be set to OFF.

Second Embodiment

A control system according to a second embodiment of the present disclosure will be described. Since the second embodiment has many parts in common with the first embodiment, the difference thereof will be mainly described, and the description of the common parts will be omitted.

In the first embodiment, the ECU 150 mounted on the vehicle 50 determines whether or not any one of the first communication path and the second communication path is under the cyberattack. However, the present disclosure is not limited to this, and a computer outside the vehicle 50 (for example, the server 30) may determine whether or not any one of the first communication path and the second communication path is under the cyberattack.

In the control system according to the second embodiment, the server 30 acquires the second command and the third command from the vehicle 50, and the server determines whether or not any one of the first communication path and the second communication path is under the cyberattack based on the first command, the second command, and the third command. Specifically, in the control system according to the second embodiment, the vehicle 50 executes the processing shown in FIG. 9, and the server 30 executes the processing shown in FIG. 10.

Figure 9:
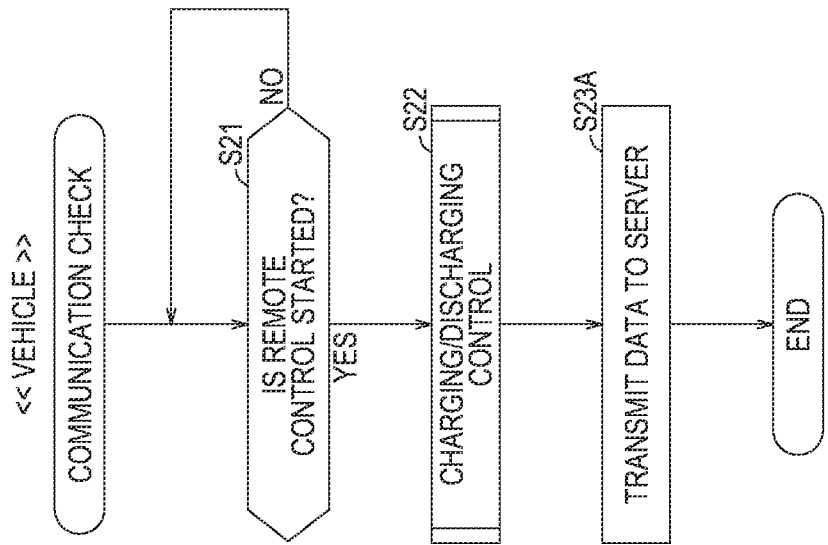
FIG. 9 is a flowchart showing processing executed by the vehicle in the communication check according to a second embodiment of the present disclosure.

FIG. 9 is a flowchart showing processing executed by the vehicle 50 in the communication check according to the second embodiment of the present disclosure. The vehicle 50 executes the processing shown in FIG. 4, and in S12 of FIG. 4, the vehicle 50 executes the processing shown in FIG. 9 described below, in place of the processing shown in FIG. 5. In S12 of FIG. 4, the server 30 executes the remote control shown in FIG. 6. S21, S22 in FIG. 9 are the same as S21, S22 in FIG. 5, respectively.

With reference to FIG. 9 together with FIGS. 1 to 3, in S21, the ECU 150 determines whether or not the remote control of the vehicle 50 by the server 30 is started. Moreover, when the remote control is started (YES in S21), the processing proceeds to S22. In S22, the ECU 150 executes the charging/discharging control shown in FIG. 6. In subsequent S23A, the ECU 150 transmits the data recorded in S42 of FIG. 6 (including the second command, the third command, the first power, and the second power) to the server 30. The vehicle 50 may transmit the second command and the first power to the server 30 via the first communication path, and may transmit the third command and the second power to the server 30 via the second communication path.

Figure 10:
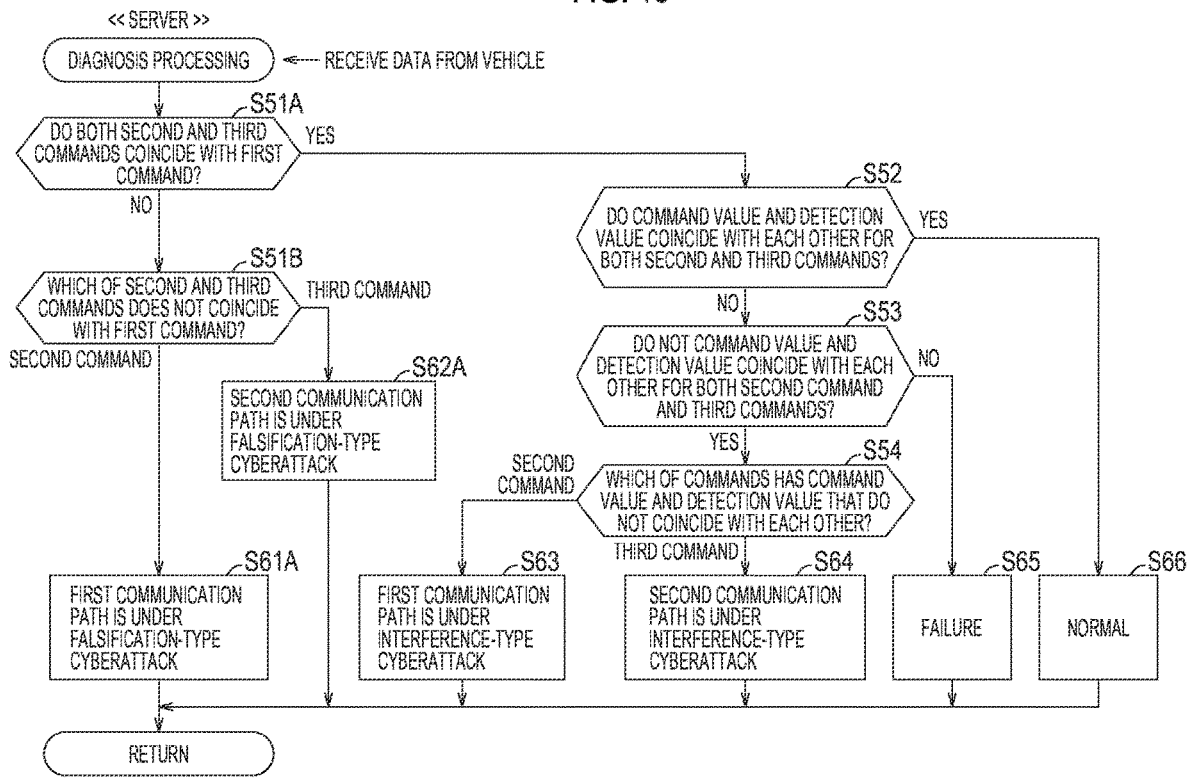
FIG. 10 is a flowchart showing processing executed by a server (control computer) in the communication check according to the second embodiment of the present disclosure.

FIG. 10 is a flowchart showing processing executed by the server 30 in the communication check according to the second embodiment. The processing shown in the flowchart is started when the server 30 receives the data (S23A in FIG. 9) from the vehicle 50. The processing shown in FIG. 10 is the same as the processing shown in FIG. 8 except that S51A, S51B, S61A, S62A are adopted in place of S51, S61, and S62. In the following, S51A, S51B, S61A, S62A will be described.

With reference to FIG. 10 together with FIGS. 1 to 3, in S51A, the control device 31 of the server 30 determines whether or not both the second command and the third command coincide with the first command. The first command may be indicated by the charging/discharging profile (see, for example, FIG. 7). The second command and the third command are included in the data received by the server 30 from the vehicle 50. In a case where both the second command and the third command coincide with the first command (YES in S51A), the processing proceeds to S52.

In a case where any one of the second command and the third command does not coincide with the first command (NO in S51A), the processing proceeds to S51B. In S51B, the control device 31 determines which of the second command and the third command does not coincide with the first command.

In a case where the second command and the first command do not coincide with each other, a determination is made as "second command" in S51B, and in subsequent S61A, the ECU 150 determines that the first communication path is under the falsification-type cyberattack. On the other hand, in a case where the third command and the first command do not coincide with each other, a determination is made as "third command" in S51B, and in subsequent S62A, the ECU 150 determines that the second communication path is under the falsification-type cyberattack.

By the processing shown in FIG. 10, the server 30 can accurately determine whether or not each of the first communication path and the second communication path is under the cyberattack. Note that both the second command and the third command do not coincide with the first command in S51B of FIG. 10, the control device 31 may determine that the communication system of the vehicle 50 has the failure.

After the diagnosis processing shown in FIG. 10 is executed, the server 30 may transmit the diagnosis result to the vehicle 50, and may execute predetermined notification processing (for example, see S27 in FIG. 5) with respect to the user of the vehicle 50.

Third Embodiment

A control system according to a third embodiment of the present disclosure will be described. Since the third embodiment has many parts in common with the second embodiment, the difference thereof will be mainly described, and the description of the common parts will be omitted.

In the control system according to the third embodiment, the server 30 executes the diagnosis processing for each of the vehicles managed by the server 30. The server 30 records the diagnosis result of each vehicle in the storage device 32 separately by a vehicle ID, and sequentially updates the recorded diagnosis result. The vehicles managed by the server 30 may have different configurations from each other, but in the third embodiment, each vehicle has the configuration shown in FIG. 1.

Figure 11:
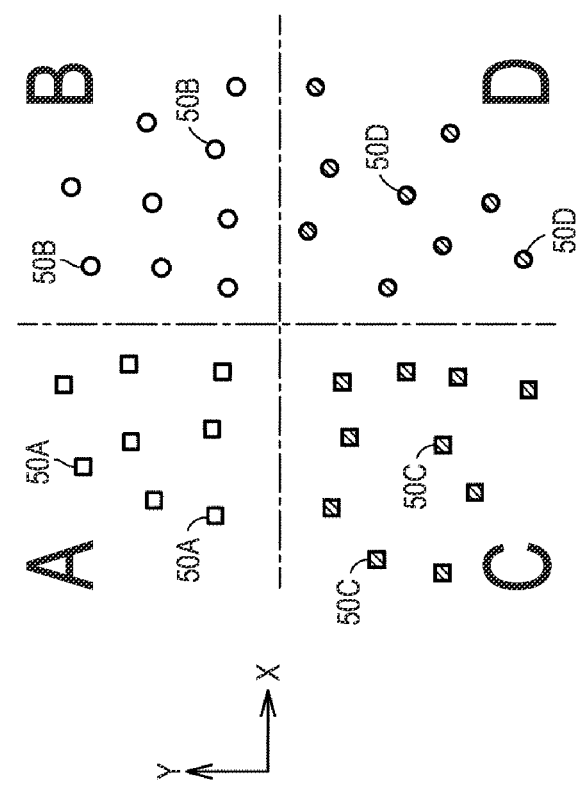
FIG. 11 is a diagram showing a distribution of vehicles in each region according to a third embodiment of the present disclosure.

FIG. 11 is a diagram showing a distribution of the vehicles for each region according to the third embodiment. In FIG. 11, an X coordinate and a Y coordinate indicate longitude and latitude (vehicle position). With reference to FIG. 11, vehicles 50A to 50D managed by the server 30 present in regions A to D. The vehicles 50A, 50B, 50C, 50D present in the regions A, B, C, D, respectively.

Figure 12:
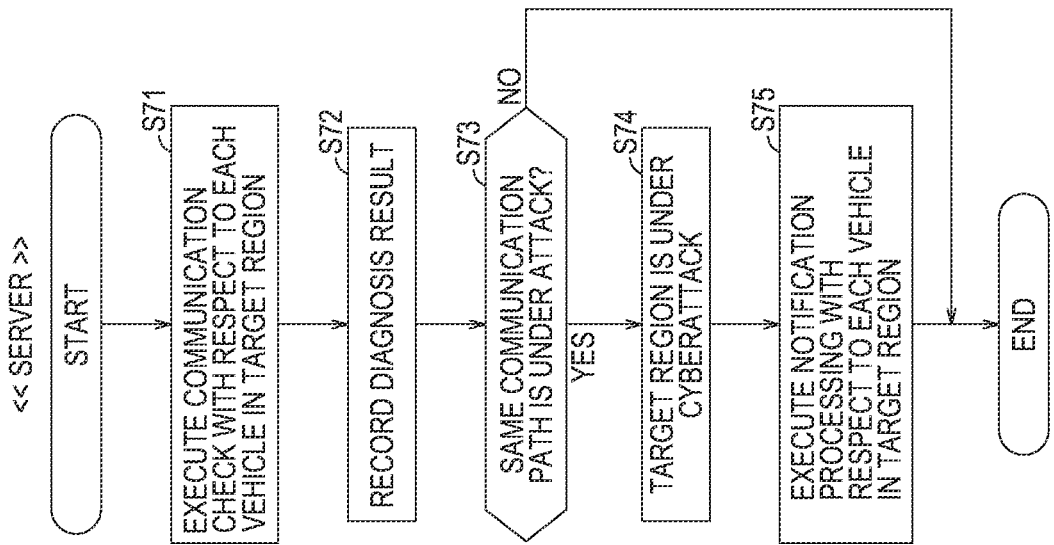
FIG. 12 is a flowchart showing processing related to the communication check executed by the server (control computer) according to the third embodiment of the present disclosure.

The server 30 executes the processing shown in FIG. 12 described below for each of the regions A to D. FIG. 12 is a flowchart showing processing related to the communication check executed by the server 30 in the third embodiment. The processing shown in the flowchart is executed for each region. In the following, the region that is a processing target (any one of regions A to D) will be referred to as a "target region".

With reference to FIG. 12 together with FIGS. 1 to 3, in S71, the control device 31 of the server 30 executes the communication check (including the diagnosis processing) for each vehicle in the target region. Note that the vehicle for which the server 30 executes the communication check is limited to the vehicle in which both the flags F1, F2 are set to ON (see FIG. 4). A method of the communication check for each vehicle may be the same as a method of the communication check according to the second embodiment.

In S72, the control device 31 records the diagnosis result of each vehicle acquired in S71 in the storage device 32. In subsequent S73, the control device 31 determines whether or not a predetermined number or more of the vehicles present in the target region are under the cyberattack on the same communication path by using the diagnosis result of each vehicle. For example, in a case where the predetermined number or more of the vehicles present in the target region are under the cyberattack on the first communication path, a determination is made as YES in S73. In addition, even in a case where the predetermined number or more of the vehicles present in the target region are under the cyberattack on the second communication path, a determination is made as YES in S73.

In a case where a determination is made as YES in S73, the control device 31 determines in S74 that the target region is under the cyberattack. Moreover, in S75, the control device 31 executes the notification processing for the user of each vehicle present in the target region. For example, in a case where the region A shown in FIG. 11 is under the cyberattack, the notification processing is executed with respect to the user of each vehicle 50A present in the region A. The user terminal of each vehicle managed by the server 30 is registered in the server 30. The user terminal may be the mobile terminal, or may be an in-vehicle terminal. Information registered in the server 30 is associated with the vehicle ID and stored in the storage device 32.

A method of notification processing in S75 is optional. The control device 31 may cause the touch panel display of the portable terminal carried by the vehicle user to display a predetermined message, for example (see S27 in FIG. 5). When the processing of S75 is executed, a series of processing shown in FIG. 12 is terminated. The control device 31 of the server 30 functions as an example of a "notification unit" according to the present disclosure.

On the other hand, in a case where a determination is made as NO in S73, the series of processing shown in FIG. 12 is terminated without executing the processing of S74, S75.

With the processing shown in FIG. 12, it is possible to accurately determine the presence or absence of the cyberattack on the region. In addition, by the notification processing (S75), it is easier for the user to grasp that the cyberattack occurs, and to take countermeasures at an early stage.

Figure 13:
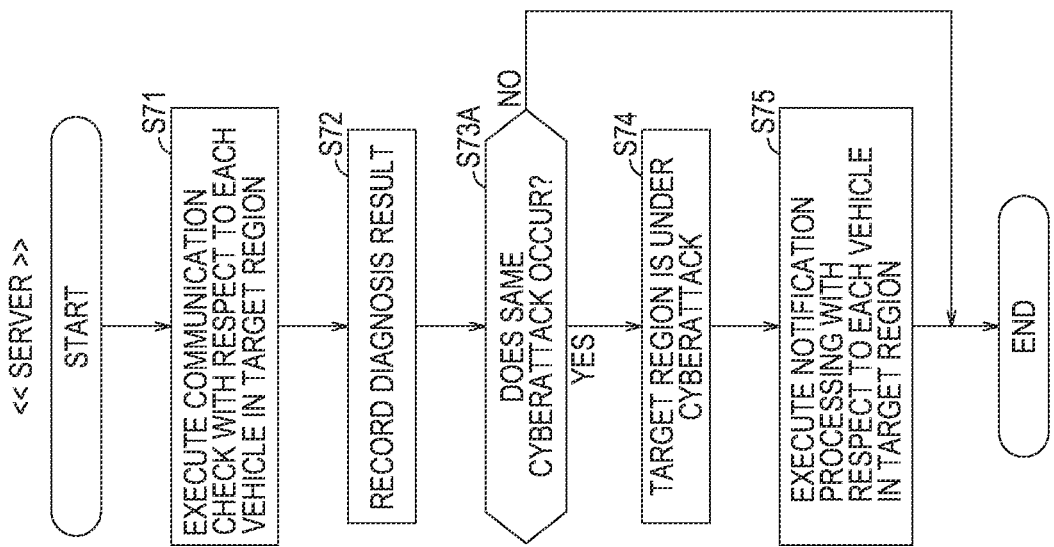
FIG. 13 is a flowchart showing a modification example of the processing shown in FIG. 12.

FIG. 13 is a flowchart showing a modification example of the processing shown in FIG. 12. The processing shown in FIG. 13 is the same as the processing shown in FIG. 12 except that S73A is adopted in place of S73. In the following, S73A will be described.

With reference to FIG. 13 together with FIGS. 1 to 3, in S73A, the control device 31 of the server 30 determines whether or not the predetermined number or more of the vehicles present in the target region are under the same cyberattack by using the diagnosis result of each vehicle. The control device 31 may recognize that the vehicles that are under the cyberattack have the same symptom, and that the vehicles are under the same cyberattack. For example, the control device 31 may recognize that the vehicles that are under the cyberattack are under the same cyberattack in a case where the command for the same communication path is similarly falsified.

Figure 14:
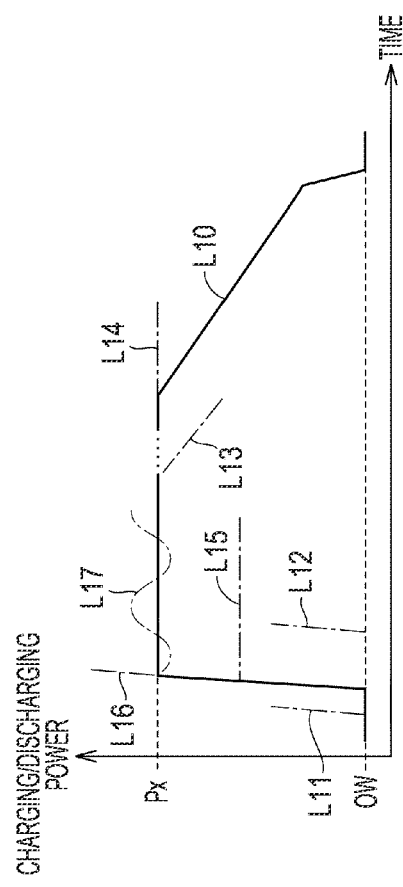
FIG. 14 is a diagram for describing an example of a method of determining the presence or absence of a cyberattack on a region in the flowchart shown in FIG. 13.

FIG. 14 is a diagram for describing an example of a method of determining the presence or absence of the cyberattack on the region in the flowchart shown in FIG. 13.

With reference to FIG. 14, in this example, the patterns in which the first command corresponding to the line L10 is falsified are classified into predetermined patterns (for example, seven patterns indicated by lines L11 to L17), and in a case where the command for the same communication path (second command or the third command) is falsified with in the same pattern, a determination is made as YES in S73A in FIG. 13. The line L11 indicates a pattern in which the start of charging/discharging is earlier than the first command. The line L12 indicates a pattern in which the start of charging/discharging is later than the first command. The line L13 indicates a pattern in which the termination of charging/discharging is earlier than the first command. The line L14 indicates a pattern in which the termination of charging/discharging is later than the first command. The line L15 indicates a pattern in which the charging/discharging power in the stable period is lower than the first command. The line L16 indicates a pattern in which the charging/discharging power in the stable period is higher than the first command. The line L17 indicates a pattern in which the charging/discharging power is not stable in the stable period.

With reference to FIG. 13 together with FIGS. 1 to 3 again, in a case where a determination is made as YES in S73A, the control device 31 determines in S74 that the target region is under the cyberattack, and executes the notification processing with respect to the user of each vehicle present in the target region in S75. On the other hand, in a case where a determination is made as NO in S73A, the series of processing shown in FIG. 13 is terminated without executing the processing of S74, S75. Even with the processing shown in FIG. 13, it is possible to accurately determine the presence or absence of the cyberattack on the region.

Note that S71 of FIG. 13, the server 30 may use solely the vehicles having the same SOC of the battery 130 as the target of the communication check. For example, in a case where the communication check is executed by using the charging profile, solely the vehicles having the SOC of the battery 130 that is equal to or less than a predetermined value (for example, 20%) may be used as the target of the communication check. In addition, in a case where the communication check is executed by using the discharging profile, solely the vehicles having the SOC of the battery 130 that is equal to or more than a predetermined value (for example, 80%) may be used as the target of the communication check. As a result, it is possible to easily and accurately determine whether or not these vehicles are under the same cyberattack.

ANOTHER EMBODIMENT

At least a part of the functions related to the remote control implemented in the server 30 in each of the embodiments described above may be mounted on the mobile terminal instead of the stationary computer. In addition, at least a part of the functions related to the diagnosis processing implemented in the server 30 in the second and third embodiments described above may be mounted on the mobile terminal instead of the stationary computer.

In each of the embodiments described above, the data used for the diagnosis processing is acquired and recorded by using the stable period during charging/discharging for executing the energy management. However, the present disclosure is not limited to this, and charging/discharging for acquiring the data used for the diagnosis processing may be executed before or after charging/discharging for executing the energy management, and may acquire and record the data during charging/discharging.

In each of the embodiments described above, the control computer (server 30) remotely controls both charging and discharging of the power storage device mounted on the control target (vehicle 50). However, the present disclosure is not limited to this, and the control computer may remotely control solely one of charging and discharging of the power storage device.

The power company may be spun off by business. The power generation company and the power transmission and distribution company may be different companies. One aggregator may serve as both the higher aggregator and the lower aggregator. The control computer may receive the request for the energy management from the power market. The control computer is not limited to the aggregator server, and any computer can communicate with the vehicle via the communication paths.

The configuration of the vehicle is not limited to the configuration shown in FIG. 1. For example, the vehicle may be configured to solely execute any one of external charging and external power supply. The vehicle may be configured to execute non-contact charging. The vehicle is not limited to a passenger car, and may be a bus or a truck. The vehicle is not limited to the BEV, and may be the PHEV equipped with the internal combustion engine. The vehicle may be configured to execute autonomous driving or may have a flight function.

The control target is not limited to the vehicle, and may be a vehicle other than the conveyance (railroad vehicle, ship, airplane, and the like), the unmanned moving object, the building, and the electrical device.

The embodiments disclosed this time should be considered to be exemplary examples and not restrictive in all respects. The scope of the present disclosure is shown by the scope of claims rather than the description of the embodiments described above, and is intended to include all changes within the meaning and scope equivalent to the scope of claims.

What is claimed is:

1. A control system comprising a computer configured to remotely control at least one of charging and discharging of a power storage device mounted on a control target, wherein:
   the computer is configured to transmit a first command indicating charging power or discharging power of the power storage device to the control target via each of a first communication path and a second communication path; and
   the control system further includes a determination unit mounted on the control target and configured to:
      determine whether or not any one of the first communication path and the second communication path is under a cyberattack by using a second command received by the control target via the first communication path when the computer transmits the first command, and a third command received by the control target via the second communication path when the computer transmits the first command;
      in a case where the second command and the third command do not coincide with each other, determine that any one of the first communication path and the second communication path is under the cyberattack;
      acquire first power indicating charging power or discharging power of the power storage device when charging or discharging in response to the second command is executed, and second power indicating charging power or discharging power of the power storage device when charging or discharging in response to the third command is executed, and
      in a case where the second command and the third command coincide with each other, power indicated by the second command and the first power coincide with each other, and power indicated by the third command and the second power coincide with each other, determine that both the first communication path and the second communication path are not under the cyberattack.

2. The control system according to claim 1, wherein the determination unit is configured to, in a case where the second command and the third command do not coincide with each other, specify which of the first communication path and the second communication path is under the cyberattack by using the first power and the second power.

3. The control system according to claim 1, wherein the determination unit is configured to
   in a case where the second command and the third command coincide with each other, the power indicated by the second command and the first power do not coincide with each other, and the power indicated by the third command and the second power coincide with each other, determine that the first communication path is under the cyberattack, and
   in a case where the second command and the third command coincide with each other, the power indicated by the second command and the first power coincide with each other, and the power indicated by the third command and the second power do not coincide with each other, determine that the second communication path is under the cyberattack.

4. The control system according to claim 1, wherein the determination unit is configured to, in a case where the second command and the third command coincide with each other, the power indicated by the second command and the first power do not coincide with each other, and the power indicated by the third command and the second power do not coincide with each other, determine that a failure occurs in the control target.

5. The control system according to claim 1, wherein:
   the computer is configured to execute a discharging control of the power storage device such that a first discharging period in which the first command is transmitted from the computer to the control target via the first communication path and the control target executes discharging of the power storage device in response to the second command, and a second discharging period in which the first command is transmitted from the computer to the control target via the second communication path and the control target executes discharging of the power storage device in response to the third command are included in one discharging of the power storage device; and
   the determination unit is configured to determine whether or not any one of the first communication path and the second communication path is under the cyberattack by using the second command in the first discharging period and the third command in the second discharging period.

6. The control system according to claim 1, wherein the control target is configured to:
   in a case where the determination unit determines that the first communication path is under the cyberattack, prohibit charging and discharging of the power storage device in response to a command received by the control target via the first communication path, and in a case where the determination unit determines that the second communication path is under the cyberattack, prohibit charging and discharging of the power storage device in response to a command received by the control target via the second communication path.

7. The control system according to claim 1, wherein:
the control target is a vehicle;
the first communication path is a communication path through which a signal is transmitted from the computer to the vehicle via electric vehicle supply equipment; and
the second communication path is a communication path through which a signal is transmitted from the computer to the vehicle by wireless communication without the electric vehicle supply equipment.

8. The control system according to claim 1, wherein the determination unit is configured to, in a case where a predetermined number or more of the control targets present in a predetermined region are under the cyberattack on the same communication path, determine that the predetermined region is under the cyberattack.

9. The control system according to claim 8, wherein the computer includes a notification unit configured to, in a case where the determination unit determines that the predetermined region is under the cyberattack, execute notification processing with respect to a user of the control target present in the predetermined region.

10. The control system according to claim 1, wherein the determination unit is configured to, in a case where a predetermined number or more of the control targets present in a predetermined region are under the same cyberattack, determine that the predetermined region is under the cyberattack.

11. A control system
comprising a computer configured to remotely control at least one of charging and discharging of a power storage device mounted on a control target, wherein:
the computer is configured to transmit a first command indicating charging power or discharging power of the power storage device to the control target via each of a first communication path and a second communication path, and
the control system further includes a determination unit mounted on the computer and configured to:
determine whether or not any one of the first communication path and the second communication path is under a cyberattack by using a second command received by the control target via the first communication path when the computer transmits the first command, and a third command received by the control target via the second communication path when the computer transmits the first command, wherein:
the computer is configured to acquire the second command and the third command from the control target; and
the determination unit is configured to
in a case where the first command and the second command do not coincide with each other, determine that the first communication path is under the cyberattack, and
in a case where the first command and the third command do not coincide with each other, determine that the second communication path is under the cyberattack.

12. A control system
comprising a computer configured to remotely control at least one of charging and discharging of a power storage device mounted on a control target, wherein:
the computer is configured to transmit a first command indicating charging power or discharging power of the power storage device to the control target via each of a first communication path and a second communication path, and
the control system further includes a determination unit configured to:
determine whether or not any one of the first communication path and the second communication path is under a cyberattack by using a second command received by the control target via the first communication path when the computer transmits the first command, and a third command received by the control target via the second communication path when the computer transmits the first command, wherein:
the computer is configured to execute a charging control of the power storage device such that a first charging period in which the first command is transmitted from the computer to the control target via the first communication path and the control target executes charging of the power storage device in response to the second command, and a second charging period in which the first command is transmitted from the computer to the control target via the second communication path and the control target executes charging of the power storage device in response to the third command are included in one charging of the power storage device; and
the determination unit is configured to determine whether or not any one of the first communication path and the second communication path is under the cyberattack by using the second command in the first charging period and the third command in the second charging period.

* * * * *